(12) United States Patent
Zheng et al.

(10) Patent No.: US 11,521,248 B2
(45) Date of Patent: Dec. 6, 2022

(54) METHOD AND SYSTEM FOR TRACKING OBJECTS IN AN AUTOMATED-CHECKOUT STORE BASED ON DISTRIBUTED COMPUTING

(71) Applicant: AiFi Inc., Santa Clara, CA (US)

(72) Inventors: Ying Zheng, San Jose, CA (US); Steve Gu, San Jose, CA (US); Shuang Liu, Stanford, CA (US); Juan Ramon Terven-Salinas, Querétaro (MX); Marek Drozdowski, Szczecin (PL); Joao Falcao, San Jose, CA (US)

(73) Assignee: AiFi Inc., Santa Clara, CA (US)

( * ) Notice: Subject to any disclaimer, the term of this patent is extended or adjusted under 35 U.S.C. 154(b) by 437 days.

(21) Appl. No.: 16/713,848

(22) Filed: Dec. 13, 2019

(65) Prior Publication Data

US 2021/0182922 A1    Jun. 17, 2021

(51) Int. Cl.
*G06Q 30/04* (2012.01)
*G06Q 30/06* (2012.01)
*G06N 20/00* (2019.01)
*G06T 7/73* (2017.01)
*G06T 7/246* (2017.01)
*G06T 7/60* (2017.01)
*H04N 5/232* (2006.01)
(Continued)

(52) U.S. Cl.
CPC ............. *G06Q 30/04* (2013.01); *G06N 20/00* (2019.01); *G06Q 30/0639* (2013.01); *G06T 7/246* (2017.01); *G06T 7/60* (2013.01); *G06T 7/73* (2017.01); *G06T 7/90* (2017.01); *G06V 40/20* (2022.01); *H04N 5/23296* (2013.01); *H04N 5/23299* (2018.08); *G06T 2207/30196* (2013.01)

(58) Field of Classification Search
CPC .... G06Q 30/04; G06Q 30/0639; G06N 20/00; G06N 7/005; G06T 7/246; G06T 7/60; G06T 7/73; G06T 7/90; G06T 2207/30196; G06T 2207/10016; G06T 2207/10024; G06T 2207/10028; G06T 2207/10048; G06T 7/292; G06V 40/20; G06V 20/52; G06V 40/107; G06V 40/172; H04N 5/23296; H04N 5/23299; G06K 9/6272
USPC ......................................................... 705/26
See application file for complete search history.

(56) References Cited

U.S. PATENT DOCUMENTS

| | | | |
|---|---|---|---|
| 8,267,316 B2 * | 9/2012 | Ostrowski | A47F 9/045 235/383 |
| 9,330,474 B1 * | 5/2016 | Shekar | G06T 7/60 |
| 10,185,954 B2 * | 1/2019 | Mizhen | G06Q 20/36 |

(Continued)

*Primary Examiner* — Jerome Grant, II

(57) ABSTRACT

Methods, systems, and apparatus, including computer programs encoded on computer storage media, for tracking objects in a store. One of the methods includes receiving, by one or more first computing devices, data captured by one or more sensors in the store; identifying, by the one or more first computing devices, a plurality of objects based on the received data, wherein the identified objects comprise one or more persons and one or more product items; extracting, by the one or more first computing devices, a plurality of features associated with each of the identified objects; generating, by the one or more first computing devices, a digest comprising information of the extracted features associated with the identified objects; and sending, by the one or more first computing devices, the digest to one or more second computing devices for processing.

18 Claims, 13 Drawing Sheets

(51) Int. Cl.
*G06T 7/90* (2017.01)
*G06V 40/20* (2022.01)

(56) References Cited

U.S. PATENT DOCUMENTS

| | | | |
|---|---|---|---|
| 10,769,579 B1* | 9/2020 | Smith | G06Q 10/087 |
| 10,936,062 B2* | 3/2021 | Maeng | H04L 12/282 |
| 10,956,777 B1* | 3/2021 | Mirza | G06T 7/246 |
| 11,059,506 B2* | 7/2021 | Hagen | B62B 3/1464 |
| 11,113,837 B2* | 9/2021 | Mirza | G01G 19/52 |
| 11,132,550 B2* | 9/2021 | Krishnamurthy | G06V 40/107 |
| 2006/0283943 A1* | 12/2006 | Ostrowski | G07F 7/02 |
| | | | 235/383 |
| 2013/0018741 A1* | 1/2013 | Ostrowski | G07G 1/0036 |
| | | | 705/23 |
| 2014/0129378 A1* | 5/2014 | Richardson | G06Q 30/0639 |
| | | | 705/26.8 |
| 2019/0172039 A1* | 6/2019 | Kambara | G06Q 20/208 |

* cited by examiner

METHOD AND SYSTEM FOR TRACKING OBJECTS IN AN AUTOMATED-CHECKOUT STORE BASED ON DISTRIBUTED COMPUTING

TECHNICAL FIELD

The disclosure relates generally to tracking objects in an automated-checkout store.

BACKGROUND

Shopping environments may range in size from 100-square-feet mom-and-pop stores to 200,000-square-feet warehouse style grocery stores or outlets. A retail environment may provide for sale a variety of products and serve a variety of customers. Inventory management and customer service provided in the retail environment may often be labor-intensive. For example, employees are often charged with responsibilities such as checking inventory, replenishing products that are sold out, finding and organizing misplaced products, and checking out customers. Particular tasks for managing a retail environment may also be time-consuming for customers. For example, lines may often be formed in front of checkout counters, in which customers may wait for a cashier to scan individual product items and take payment information from other customers. Using employees to perform these tasks may also cause human errors, such as charging for wrong product items. These human errors may result in further delays, inconveniences, and costs.

Using machine learning and artificial intelligence technologies in conjunction with cameras and other sensors laid out across the store, various necessary functions of the store can be automized. These automation solutions may require collecting a large amount of sensor data and executing computing-intensive tasks. The increasing resolution of images and videos generated by sensors may aggravate the load on processing and data-transmission resources available to the store. Centralized solutions that requires the aggregation of sensor data at particular computing device may prove costly and impractical. Thus, there is need for methods and systems that reduce the volume of data to be transferred and balance the computing workloads in an automated-checkout store.

SUMMARY

Various embodiments of the present specification may include systems, methods, and non-transitory computer readable media for tracking objects, such as customers and product items, in an automated-checkout store.

According to one aspect, the method for tracking objects in a store may comprise: receiving, by one or more first computing devices, data captured by one or more sensors in the store; identifying, by the one or more first computing devices, a plurality of objects based on the received data, wherein the identified objects comprise one or more persons and one or more product items; extracting, by the one or more first computing devices, a plurality of features associated with each of the identified objects; generating, by the one or more first computing devices, a digest comprising information of the extracted features associated with the identified objects; and sending, by the one or more first computing devices, the digest to one or more second computing devices for processing.

In some embodiments, the method may further comprise: determining, by the one or more second computing devices, one or more interactions between one of the one or more persons and one of the one or more product items based on the digest; and generating, by one or more the second computing devices, a bill for the person based on the determined one or more interactions.

In some embodiments, the generating a bill may comprise: retrieving, by the one or more second computing devices, price information of the one of the one or more product items; and generating, by the one or more second computing devices, the bill based on the retrieved price information.

In some embodiments, the method may further comprise: receiving, by the one or more first computing devices from the one or more second computing devices, data associated with a machine-learning model, wherein the machine-learning model is configured to identify one or more objects based on one or more features associated with each of the one or more objects.

In some embodiments, the identifying a plurality of objects may comprise: identifying, by the one or more first computing devices, a person based on the received data; and identifying, by the one or more first computing devices based on the received data, one or more product items that are located in proximity to a hand of the person.

In some embodiments, the features associated with each of the one or more identified objects comprise: a location, a weight, a shape, a color, a surface force image, a position, or a conductivity.

In some embodiments, the generating a digest comprising information of the extracted features associated with the identified objects comprise: determining, by the one or more first computing devices, an interaction between one of the one or more persons and one of the one or more product items based on the extracted features; and generating, by the one or more first computing devices, the digest based on the determined interaction.

In some embodiments, the method may further comprise: receiving, by the first computing device from the second computing device, information associated with a plurality of features and an identifier; determining that the received identifier corresponds to one of the identified objects based on comparing the received features with the extracted features associated with the identified object; and wherein the generating a digest may comprise including a mapping relationship between the received identifier and one or more of the features associated with the identified object in the digest.

In some embodiments, the method may further comprise: receiving, by the one or more first computing devices from the one or more second computing devices, information associated with a plurality of features and an identifier; determining that the received identifier corresponds to one of the identified objects based on comparing the received features with the extracted features associated with the identified object; and wherein the generating a digest comprises including a mapping relationship between the received identifier and one or more of the features associated with the identified object in the digest.

In some embodiments, the method may further comprise: receiving, by one of the one or more first computing devices from a third computing device, information associated with a plurality of features of one of the identified objects; and wherein the generating a digest comprises including the received information in the digest.

In some embodiments, the control commands may comprise: reboot, zoom in, zoom out, adjust angle, power on, power off, update firmware, or update stored data.

In some embodiments, the one or more first computing devices may be organized based on a hierarchical structure; the one or more first computing devices may comprise a group of computing devices respectively associated with a plurality of regions in the store and a different computing device associated with a region in the store that comprises the plurality of regions, wherein the different computing device is superior to the group of computing devices in the hierarchical structure; and the generating a digest may comprise: generating, by the group of computing devices, a plurality of intermediate results based on the data captured by the one or more sensors; sending, by the group of computing devices, the intermediate results to the different computing device; and generating, by the different computing device, the digest based on the intermediate results.

According to another aspect, a system for tracking objects in a store may comprise a plurality of sensors and a computer system that comprises a first computing device and a second computing device, the computer system comprising a processor and a non-transitory computer-readable storage medium storing instructions executable by the processor to cause the system to perform operations comprising receiving, by one or more first computing devices, data captured by one or more sensors in the store; identifying, by the one or more first computing devices, a plurality of objects based on the received data, wherein the identified objects comprise one or more persons and one or more product items; extracting, by the one or more first computing devices, a plurality of features associated with each of the identified objects; generating, by the one or more first computing devices, a digest comprising information of the extracted features associated with the identified objects; and sending, by the one or more first computing devices, the digest to one or more second computing devices for processing.

According to yet another aspect, a non-transitory computer-readable storage medium for tracking objects in a store may be configured with instructions executable by one or more processors to cause the one or more processors to perform operations comprising receiving, by one or more first computing devices, data captured by one or more sensors in the store; identifying, by the one or more first computing devices, a plurality of objects based on the received data, wherein the identified objects comprise one or more persons and one or more product items; extracting, by the one or more first computing devices, a plurality of features associated with each of the identified objects; generating, by the one or more first computing devices, a digest comprising information of the extracted features associated with the identified objects; and sending, by the one or more first computing devices, the digest to one or more second computing devices for processing.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Preferred and non-limiting embodiments of the invention may be more readily understood by referring to the accompanying drawings in which.

DETAILED DESCRIPTION OF THE EMBODIMENTS

Figure 1:
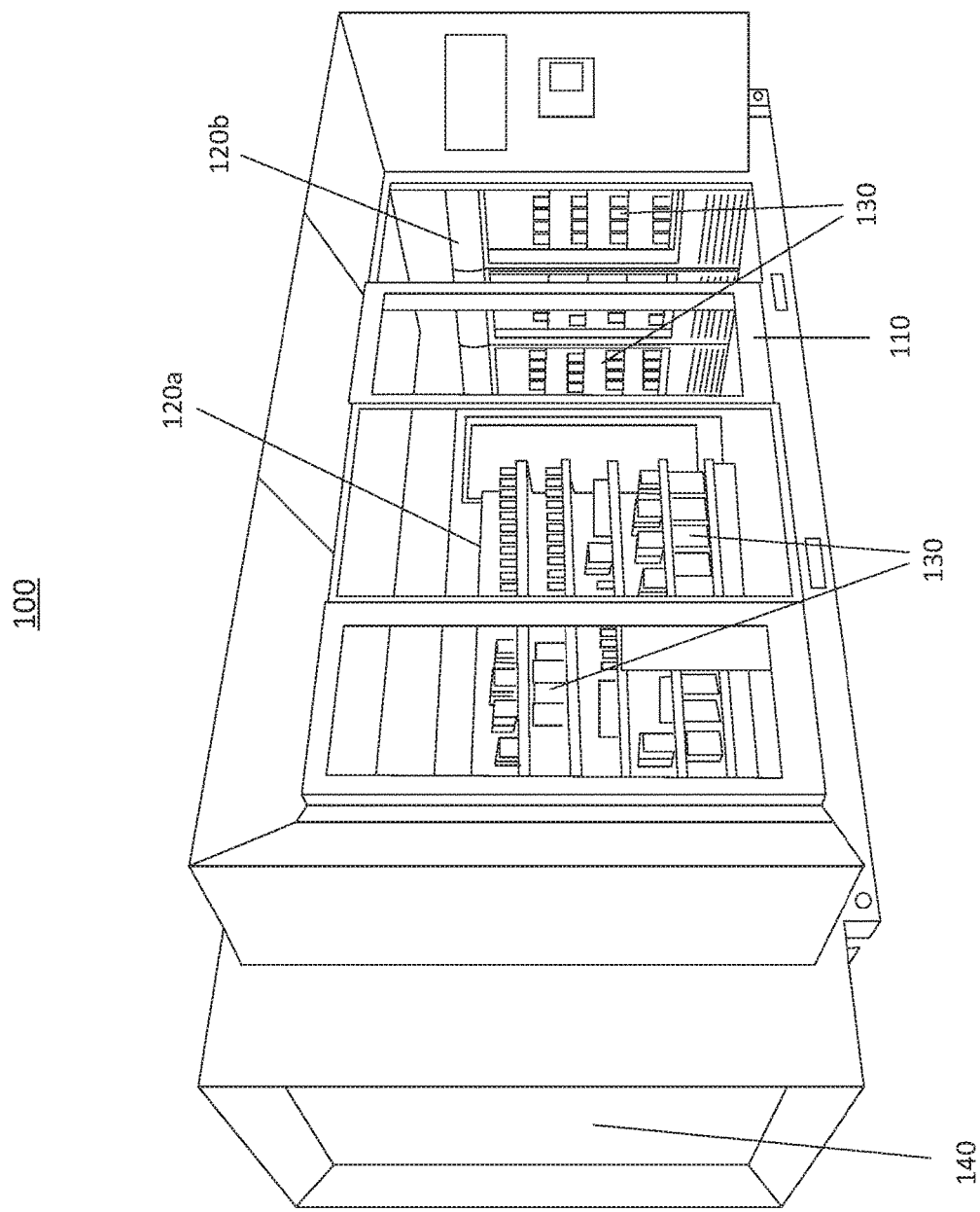
FIG. 1 illustrates an example setup of an automated-checkout store.

Specific, non-limiting embodiments of the present invention will now be described with reference to the drawings. Particular features and aspects of any embodiment disclosed herein may be used and/or combined with particular features and aspects of any other embodiment disclosed herein. It should also be understood that such embodiments are by way of example and are merely illustrative of a small number of embodiments within the scope of the present invention. Various changes and modifications obvious to one skilled in the art to which the present invention pertains are deemed to be within the spirit, scope and contemplation of the present invention as further defined in the appended claims.

In some embodiments, a store may provide automated checkout services to customers. Such an automated-checkout store may comprise a plurality of sensors that collect data from the environment, and particularly about product items, persons, and other objects, both immobile and movable, in the store. A computer system in the automated-checkout store may process the data collected by the sensors to recognize and track product items and objects, to identify and track persons, and to determine interactions between the persons and the product items and/or objects. Based on the sensor data, the computer system may determine a person's activities such as picking up a product item from a shelf, placing a product item back, dropping a product item in a shopping cart, or other activities of interest. The computer system may also determine the identities and prices of the product items interacted with by the person. In this manner, the computer system may automatically charge the person based on his or her purchase and generate an itemized receipt.

In some embodiments, a person entering such an automated-checkout store may provide identification information by, for example, swiping a payment card or identification card, scanning a quick response ("QR") code or a ticket. The person may then freely pick up product items on sale in the store. Based on data collected by sensors in the store, a computer system may automatically determine the activities of the person. After shopping, the person may directly walk out of the store, knowing that an appropriate payment will be automatically deducted from her account. Particular embodiments may reduce or eliminate the need for human labor for managing a retail environment, provide customers a quick and smooth shopping and checkout experience, and reduce a likelihood of mistakes that may be made by the retailer. Furthermore, particular embodiments use an integrated system to manage various aspects of the retail environment. Such a system may effectively coordinate various services and efficiently use or re-use information collected for different purposes. For example, a detected activity by a person of picking up a product item and placing it in a shopping cart may be used to determine an inventory level of the product item as well as to generate a bill for the customer. In this manner, the efficiency of computer systems used in retail environments may be improved.

In some embodiments, the automated-checkout system may be installed in a traditional retail environment by affixing sensors and computing systems in different areas of the environment. In other embodiments, the automated-checkout system may be implemented as a "Nano Store" or a walk-in vending machine, which may be a modular brick & mortar store that is built in with automated checkout technologies. The Nano Store or walk-in vending machine may be of a small and manageable size (e.g., 200 square feet). It may be built in with all the fixtures, sensors, and computer systems, so that the store will automatically monitor customer activities and provide automated checkout. It may be easily disassembled, re-assembled, and transported. Alternatively, it may be implemented within a unitary enclosure. The enclosure may be made mobile using, for example, wheels at the bottom. Robotic tools (e.g., robotic arms) may also be used in such a store to facilitate functions such as automatic stocking of product items.

In some embodiments, the automated-checkout system may comprise a plurality of sensors laid out across the store and shelves and a computer system processing the data collected by the sensors. The sensors may continuously or intermittently collect data such as images, videos, information of pressure, vibration, weight, proximity, another suitable data, or any combination thereof. The data may be collected as raw data and usually large in size. These collected data may be aggregated and analyzed by the computer system to identify objects, detect interactions, determining purchases, and thus offering shopping automation. In some embodiments, these sensors may be equipped with computing resources including processors, such as graphics processing units (GPU), central processing units (CPU), system on a chip (SoC), or tensor processing unit (TPU), and memories. With computing capacity, the sensors may locally perform certain preliminary actions on the data before sending it out. For example, the sensors may perform compression on digital images and videos to reduce their storage and transmission footprint. As another example, the sensors may perform object detection or feature extractions from the collected images or videos using machine leaning models or pattern recognition algorithms, and send out the detected objects and the features rather than the raw data. These preliminary actions may substantially reduce the amount of data to be transferred to as well as processed by a central server. In some embodiments, the computer system may comprise a plurality of computing devices that can be classified into different tiers, such as an edge tier and a root tier. The edge tier may comprise computing devices that each may receive data from a group of sensors and perform actions such as data aggregation, object detection, feature extraction, interaction determination, another suitable action, or any combination thereof. The sensors and the edge tier may be in close physical proximity. The root tier may comprise one or more servers that aggregate the data from the computing devices of the edge tier. For example, the servers of the root tier may generate bills for customers based on the data received from the edge tier that contains the detected interactions between the customers and product items. In some embodiments, one computing device may be multi-functional. For example, a computing device equipped with sensors and sufficient computing resources may be both a sensor device, and an edge tier node or a root tier node as it is capable of performing various data processing tasks.

FIG. 1 illustrates an example setup of an automated-checkout store 100. The automated-checkout store 100 may comprise a system for tracking a person in the store 100. In some embodiments, the automated-checkout store 100 may provide an enclosed environment. The store 100 may comprise one or more doors 110, and one or more shelves, such as 120a and 120b. The doors 110 may be hinged doors, revolving doors, sliding doors, or other suitable doors. In some embodiments, the store 100 may comprise two sets of doors 110 with a small space in between to prevent multiple people from entering the store at once, which may complicate tracking of the people. In some embodiments, the shelves 120 may hold product items 130 for selection and purchase by a customer. In some embodiments, the automated-checkout store 100 may comprise one or more outer surfaces 140 that may be used for a plurality of potential purposes (e.g., displaying advertisements).

Figure 2:
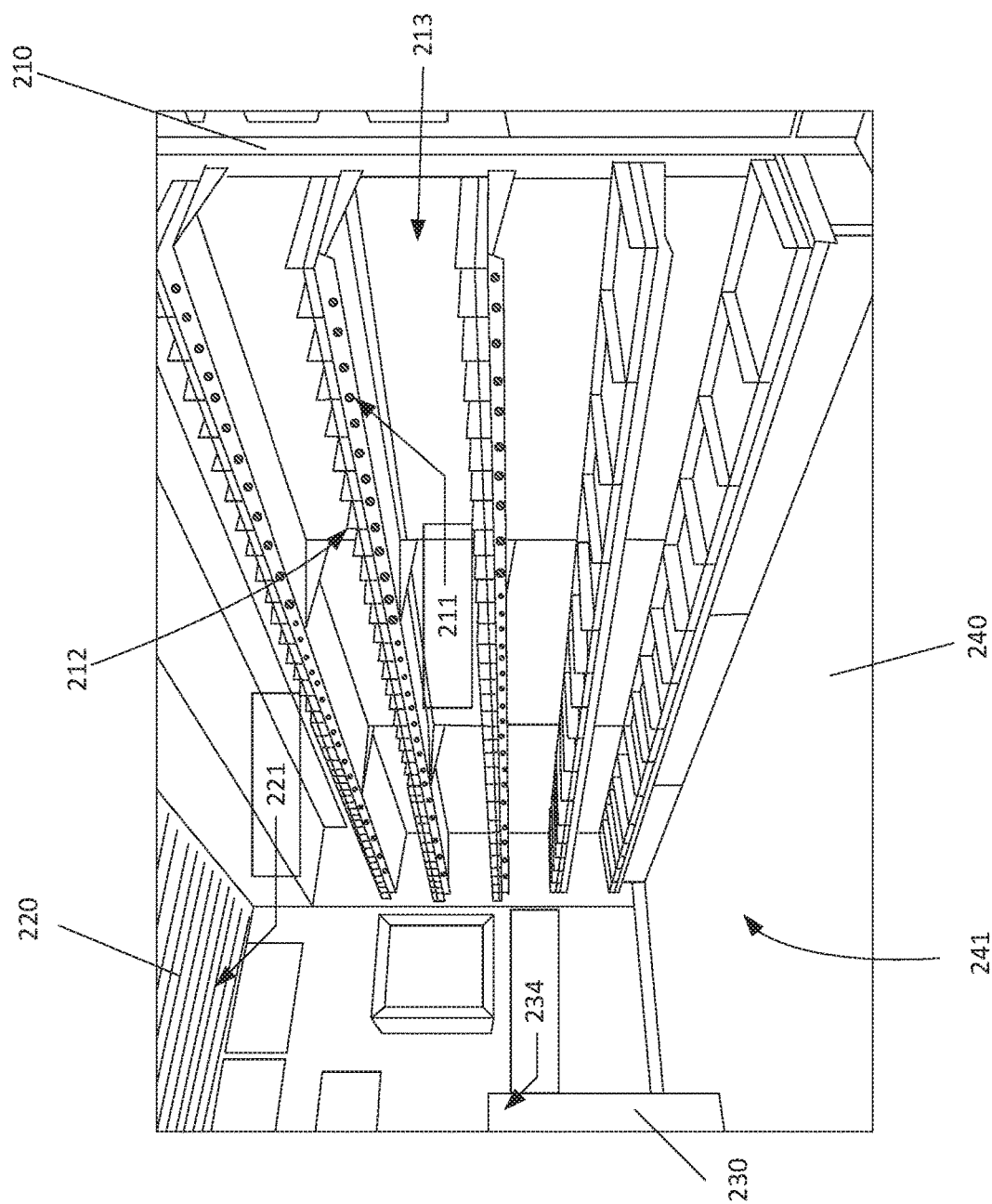
FIG. 2 illustrates example locations to place sensors in an automated-checkout store.

FIG. 2 illustrates example locations to place sensors in an automated-checkout store. In some embodiments, one or more sensors may be affixed to one or more structures in the automated-checkout store. The structures may comprise, for example, a ceiling, a floor, a shelf, a rack, a refrigerator, other suitable structures, or any combination thereof. Illustrated by FIG. 2 may be an inner space of an automated-checkout store. The automated-checkout store may comprise one or more shelves 210, a ceiling 220, one or more fixtures 230 (e.g., a peg), a floor 240. In order to collect data about product items and persons in the automated checkout store, a plurality of sensors may be placed in various locations in the indoor environment. For example, one or more sensors 211 may be affixed to the bottom of each shelf 210, one or more sensors 212 may be affixed above each shelf 210, and one or more sensors 213 may be affixed on a backboard supporting the shelves 210. As another example, one or more sensors 221 may be affixed to the ceiling 220, one or more sensors 231 may be affixed to fixtures 230, and one or more sensors 241 may be affixed to the floor 240.

In some embodiments, the sensors (e.g., the one or more sensors 211, 212, 213, 221, 231, and/or 241) placed in the automated-checkout store 100 may comprise one or more image sensors (e.g., RGB cameras, IR cameras, depth cameras), one or more weight sensors, one or more force sensors, one or more pressure sensors, one or more vibration sensors, one or more proximity sensors, one or more resistance-based film sensors, one or more capacitive sensors, other suitable sensors, or any combination thereof. The sensors may be used to collect signals associated with one or more product items and one or more persons. In some embodiments, the sensors may be powered through one or more network cables using power over ethernet ("POE"). The sensors may also be powered using one or more other suitable methods or devices.

As an example and not by way of limitation, one or more weight sensors affixed to a shelf (e.g., one of shelves 210) may measure weights of one or more product items; one or more weight sensors affixed to a floor (e.g., floor 240) may measure weights of one or more persons present in the automated-checkout store 100; one or more pressure sensors affixed to the shelf 210 may measure the shape of bottom surfaces of the product items and determine their respective positions. One or more image sensors may determine the colors and other appearance characteristics of the product items.

As another example and not by way of limitation, vibration sensors placed on corners of a shelf 210 may be used to detect vibration corresponding to an event associated with product items placed on the shelf 210 (e.g., a customer picking up a product item). One or more proximity sensors (e.g., comprising one or more infrared transceivers) placed on a surface of the shelf 210 may detect a proximity of a hand of a customer to one or more product items, which may be used to determine a movement of the hand (e.g., hovering over a product item). The data gathered by the vibration sensors and the proximity sensors may be complemented by data from one or more image sensors which may comprise one or more images of the customer and the one or more product items. Based on the data collected by these sensors, a computer system associated with the automated-checkout store may determine one or more movements of the hand of a customer with respect to one or more product items and may thereby determine customer activities such as picking up a product item or placing a product item on a shelf 210.

As yet another example and not by way of limitation, a plurality of image sensors may be used to gather image data of a person moving in the automated-checkout store 100. One or more computing devices or components thereof (e.g., a graphics processing unit (GPU), a central processing unit (CPU), a system on a chip (SoC)) may be used to process digital images and videos captured by the image sensors. Each image sensor or group of image sensors may collect data from a particular area of the automated-checkout store 100. Data from each of the one or more image sensors may be processed to determine a probability that a particular person is at a particular location. The processing results may be aggregated to determine a location of the person and to construct a model reflecting a movement path of the person during a particular period of time. The data gathered by the image sensors may be supplemented by data gathered by one or more weight sensors placed below the surface of the floor near the door 110 of the automated-checkout store 100. Changes to data from the weight sensors may indicate that a person walks in or out of the store 100.

In some embodiments, one or more image sensors in the automated-checkout store may be automatically calibrated. One or more projectors may be installed in the store. The projectors may project patterns on, for example, the floor or ceiling of the store. One or more parameters of the image sensors (e.g., position, angle, distortion factor) may be calibrated based on a portion of the pattern captured by the image sensors. Similarly, one or more patterns may be printed on one or more fixtures within the store (e.g., shelves 210). The image sensors may capture images of such patterns and automatically calibrate their parameters. In some embodiments, the projectors may also be used to project one or more images that may improve user experience. For example, price or other information about one or more products may be projected on the products.

The one or more sensors may have overlapping fields of view. Data from the one or more sensors may be fed into the computer system to be synthesized and/or integrated to acquire information of an entire automated-checkout store. In some embodiments, each of the image sensors may be calibrated using people as calibration markers. As an example, the computer system may identify body key points of persons as captured by the image sensors and match the identified body key points between the sensors. In some embodiments, the computer system may extract detections from each of the sensors, synchronize frames using timestamp, and cluster one or more persons using re-id features. The computer system may aggregate key points from one or more persons over a time period for each camera. The computer system may match key points of a same time and a same person on pairs of sensors to calibrate the one or more sensors. In some embodiments, the computer system may detect an object moving along a route and feature points on the object. The computer system may capture a first set of one or more images of the feature points of the object along the route by a first sensor and a second set of one or more images of the feature points of the object along the route by a second sensor. The computer system may calibrate the first sensor and the second sensor by matching the features points of the object along the route by the first sensor and the feature points of the object along the route by the second sensor at a same time stamp. In some embodiments, the computer system may calibrate one or more image sensors based on visual patterns or fixtures in an indoor environment. The computer system may process images of the visual patterns or fixtures and compare them with known locations and shapes of the visual patterns or fixtures to determine the locations and directions of the image sensors that captured the images. More information about calibration of image sensors is described in U.S. patent application Ser. No. 16/197,369, filed Nov. 21, 2018, which is incorporated herein by reference.

In some embodiments, the computer system for processing data collected by the sensors may be distributed within the automated-checkout store shown in FIG. 2. The computer system may include a plurality of computing devices that can be classified into different tiers. The data processing tasks may be distributed among the tiers. For example, a computing device of an edge tier may be in close physical proximity to a group of sensors or be integrated with one or more of the sensors. Such a computing device may receive sensor data (e.g., raw data) through wired connection, process the sensor data by extracting useful information, and only send the extracted information out for further processing. As another example, a computing device of a root tier may aggregate information received from multiple computing devices of the edge tier and perform actions such as generating bills, learning customer shopping behaviors, archiving data, another suitable action, or any combination thereof.

Figure 3A:
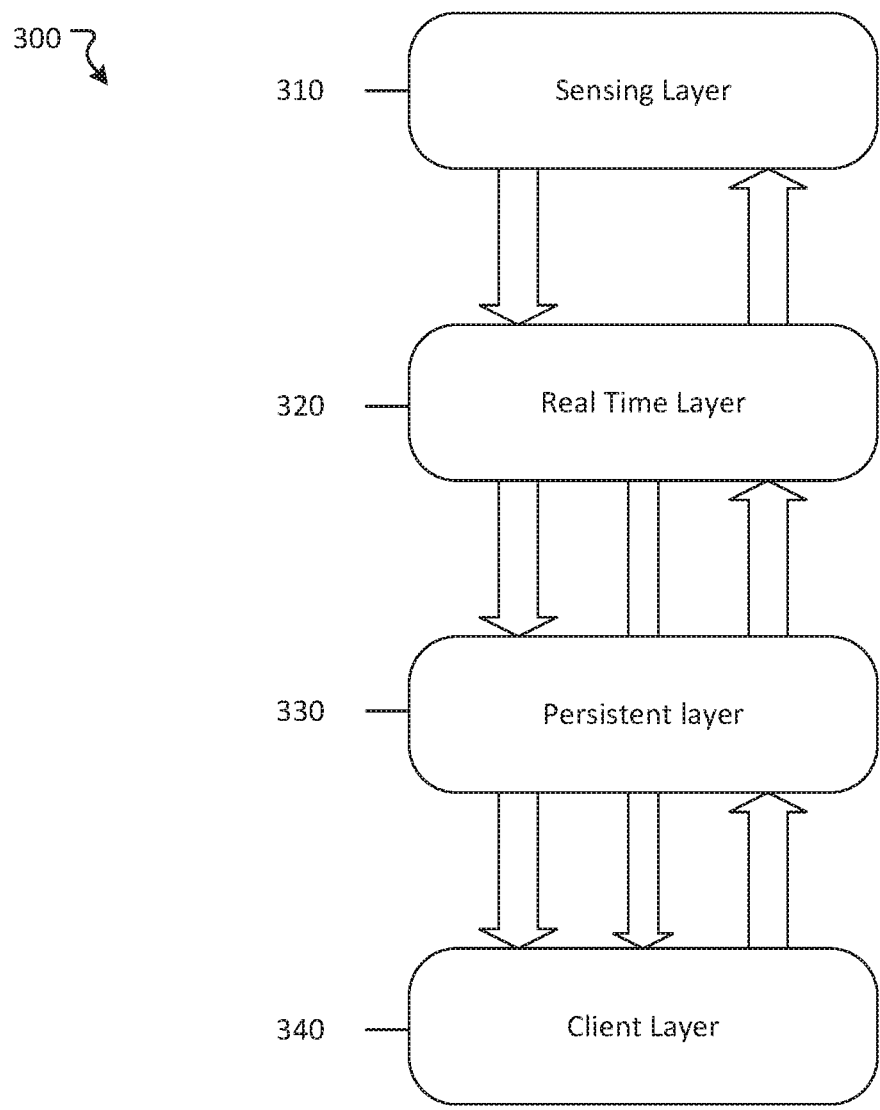
FIG. 3A illustrates an example system for tracking persons and interactions between persons and product items in a store.

FIG. 3A illustrates an example system for tracking persons and interactions between persons and product items in a store. In some embodiments, a computer system in an automated-checkout store may have the structure illustrated by FIG. 3A and may comprise one or more of the components or layers shown in FIG. 3A. In some embodiments, the computer system 300 may comprise a plurality of computers that can be classified into tiers (e.g., groups), and the computers of each tier may be used to implement the functionalities of one or more of the layers shown in FIG. 3A. In some embodiments, the system may be configured to receive many types of input from many different sensing sources. These inputs may include image and/or video signals from an array of cameras mounted in various parts of an automated-checkout store such as the ceiling, cashier level, shelf level, signals from touch capacitive sensors on shelves, signals from weight sensors on shelfs, signals from force sensors on shelfs, and/or vibration sensors on shelfs. The system may use these signals to identify a customer and monitor the product items that the customer takes out of the store, and thus automatically checkout the product items. The system may also use these signals to calculate an inventory level of each of a plurality of retail products within the store.

In some embodiments, the system may comprise a sensing layer 310 that include a plurality of sensors that provide the system with different types of data. One or more sensors (e.g., single camera (SC), multi-camera (MC), cameras at the checkout area of the retail store) may monitor people, such as customers and employees, as they move around and through the store. One or more sensors (e.g., capacitive sensors, force sensors, vibration sensors, weight sensors, location aware pressure sensors) may track objects such as retail products on a plurality of shelves. The sensing layer 310 may be implemented, for example, as the one or more sensors 211, 212, 213, 221, 231, and/or 241. The sensors may be controlled by the computer system. The computer system may deactivate one or more of the sensors due to inactivity to save energy. The sensors may be switched back to an active state based on, for example, signals collected by a neighboring sensor.

In some embodiments, the system may comprise a real time layer 320 that may determine when trigger events occur and determine logic of virtual carts. For example, the real time layer 320 may be configured to analyze the 3D rendering of motion of a particular customer and determine that the customer is reaching for an item on a particular shelf. Using this information along with weighting information from the particular shelf, as well as weight data, location aware pressure sensing data, and images of the particular shelf, the real time layer 320 may determine that a particular customer takes a particular product. The real time layer 320 may acquire information from a variety of sources, such as one or more sensors in the sensing layer 310, analyze the data in context with other data obtained from other sensors in the sensing layer 310 to obtain an accurate analysis of events occurring in the automated-checkout store. For example, the real time layer 320 at a present time may determine and log an event in which the particular customer puts an apple in a shopping cart. Subsequent to the present time, the real time layer 320 may determine that out of a direct line of sight with one of the array of cameras in the retail store that the particular customer puts an item back on the shelf. Using weight information, location aware pressure sensing and vibration sensing, the real time layer 320 may output a plurality of probabilities of what the item that was placed on the shelf was. With the information that the apple was previously placed in the shopping cart, the real time layer 320 may determine that the particular customer put the apple back on the shelf.

The real time layer 320 may further store all logged events for each customer, for example, in a database or table, and acquire a historical record of each customer. For example, the real time layer 320 may store information from image data of a location of each customer at a specific time. For example, the real time layer 320 may determine a record of all products purchased by a particular customer, a date of purchase of each of the products, a price of each of the products, and/or a record of whether the particular customer returns items to a proper location or shelf. As an example, the real time layer 320 may determine, as part of the historical record, a frequency with which a person returns products to a proper shelf or location.

In some embodiments, the system may comprise a persistent layer 330 that may execute operations related to payments and customer authentication. For example, before a customer may be granted access to the automated-checkout store, the user may be required to swipe a credit card or provide login information. The persistent layer 330 may be configured to authenticate the user and/or payment method by the user.

In some embodiments, the system may comprise a client layer 340 that may execute operations related to client interaction. For example, the client layer 340 may provide an output or display at a checkout counter. The information displayed may comprise an itemized receipt of all of the items in a particular customer's possession. In some embodiments, the client layer 340 may be configured to provide personalized advertisement as the particular customer walks through the store. For example, if the system determines that the customer is a parent carrying a baby, as the customer walks down an aisle of baby products, the client layer 340 of the system may be configured to output advertisements of a sale for a particular brand of diapers. For example, the real time layer 320 or the client layer 340 may conduct an analysis to determine a frequency of purchase of each of the products and/or a frequency of purchase for each of brand names of specific products. In such a manner, the client layer 340 may provide suggestions to the particular customer, based on the determined frequency of purchase of a type or brand of product as the customer enters the automated-checkout store. As another example, the client layer 340 may provide suggestions to the particular customer based on prices of specific products. For example, the client layer 340 may be coordinated with a customer's device, which may include, for example, an electronic system such as a mobile phone, and/or a display, to provide suggestions communicated to the customer's device.

In some embodiments, the automated-checkout store may be associated with a computer system for processing the data collected by various sensors. The computer system may comprise one or more suitable electronic devices. In some embodiments, the computer system may use sensor fusion to aggregate data received from multiple sensors. In doing so, the computer system may combine sensor data or data derived from disparate sources using error-resistance algorithms such that the resulting information has less uncertainty than would be possible when these sources were used individually. Using sensor fusion, the computer system may derive additional data than that sensed by each sensor (e.g., calculation of depth information by combining two-dimensional images from two cameras at slightly different viewpoints). In some embodiments, the computer system may perform direct fusion, which may comprise the fusion of sensor data from a set of heterogeneous or homogeneous sensors, soft sensors, and history values of sensor data. The computer system may also perform indirect fusion that uses information sources like a priori knowledge about the environment and human input. The computer system may use one or more methods or algorithms such as the central limit theorem, Kalman filter, Bayesian networks, Dempster-Shafer theory, or convolutional neural network. In some embodiments, sensor fusion for an automated-checkout store may be performed at a centralized computer system. Alternatively or additionally, sensor fusion may be performed by one or more localized computer sub-systems, whose outputs may later be aggregated. In some embodiments, using sensor fusion, the computer system may calculate a distribution for a particular value to be determined, including an average, a range, and one or more deviations. The computer system may also assign trustworthiness values for different factors contributing and weigh the factors based on the trustworthiness values.

A Bayesian network, decision network, probability network, or probabilistic directed acyclic graphical model may be a probabilistic graphical model (a type of statistical model) that represents a set of variables and their conditional dependencies via a directed acyclic graph (DAG). Nodes in a DAG may represent variables such as observable quantities, latent variables, unknown parameters, or hypotheses. Edges in a DAG may represent conditional dependencies; nodes that are not connected (no path connects one node to another) represent variables that are conditionally independent of each other. Each node may be associated with a probability function that takes, as input, a particular set of values for the node's parent variables and gives (as output) the probability (or probability distribution, if applicable) of the variable represented by the node. Bayesian networks may be used to take an event that occurred and predict the likelihood that any one of several possible known causes was the contributing factor. Bayesian networks may be used to infer unobserved variables or to learn parameters or structures.

Figure 3B:
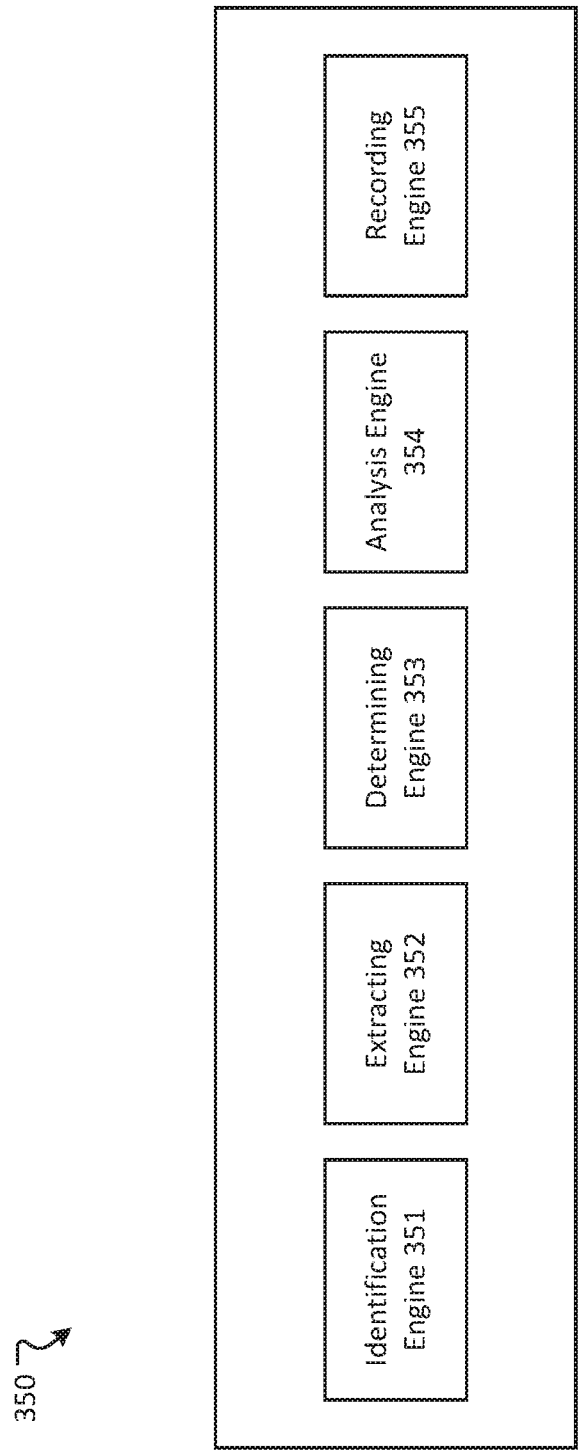
FIG. 3B illustrates example components of a computer system for tracking persons in an automated-checkout store.

FIG. 3B illustrates example components of a computer system 350 for tracking persons in an automated-checkout store. The real time layer 320 may be implemented on such a computer system 350. One or more other layers of the system 300 may also be implemented on the computer system 350. The computer system 350 may include an identification engine 351, an extracting engine 352, a determination engine 353, an analysis engine 354, and a recording engine 355. The computer system 350 may comprise one or more other suitable components. In some embodiments, the engines 351-355 may represent logical rather than physical divisions of the operations and functionalities of the computer system 350. In some embodiments, one or more of the engines 351-355 may be combined in one physical system sharing one or more processors, memories, databases, or other computing resources. In some embodiments, each of one or more of the engines 351-355 may have different sub-components implemented on different physical systems. In some embodiments, processor-executable code or software programs may implement one or more of the engines 351-355, one or more parts of the engines 351-355, or any combination thereof.

The identification engine 351 may be configured to identify a plurality of features of a person (e.g., customer). The identification of the features may be based on data associated with the person and collected by a plurality of image sensors such as in the sensor layer 310. The identifying may comprise assigning an identifier to the person and storing the features of the person in association with the identifier. The features of the person may include, as an example, facial, body, or hair features, clothing of the person, measurements of the person such as height or weight, and/or a distinctive gait or walking style of the person. The identifier may be unique for each person, and may be static or constant. For example, the identifier for each person may be unchanged every time the person walks into the automated-checkout store, and/or every time the person reappears after being lost (e.g., obscured, obstructed, or blocked by another person or landmark). The identification engine 351 may be configured to re-identify a person as he or she exits a field of view of one or the image sensors and enters a field of view of a neighboring image sensor. In some embodiments, the identification engine 351 may identify a person by linking the identifier with a person's valid payment credentials, such as a credit card, when the person enters the automated-checkout store. The person's features as recorded by the image sensors may be linked, by the identification engine 351, to the payment credentials. As a result, items removed by the person from a shelf location may be linked to the person's payment credentials, so that the person can be charged for each purchased item. In some embodiments, the identification engine 351 may determine a person's identity by determining a match between previously stored features of persons saved in a database, memory, or lookup table, and real-time features determined from the image sensors. In this way, the computer system 350 may automatically identify payment credentials associated with the person that have been previously stored based on the determination of the person's identity.

The extracting engine 352 may be configured to extract data associated with the person from the received data that was collected by the image sensors. The data associated with the person may be extracted based on the features associated with the identifier of the person. The extracted data may correspond to a plurality of time periods. As an example and not by way of limitation, the system 350 may have received a plurality of images captured by a plurality of image sensors in a shopping environment. The extracting engine 352 may match the identified features of a person with one or more of the received images to identify those images that include the person. The extracting engine 352 may provide these images for further processing. As another example and not by way of limitation, the extracting engine 352 may determine a location of a person in a preceding time period. It may identify one or more of the image sensors each having a field of view that encompasses the determined location. It may obtain data collected by such identified image sensors in the relevant time period for use in determine the location of the person.

The determination engine 353 may be configured to determine a location of a person in each of a plurality of time periods based on the extracted data corresponding to the time period (e.g., the respective time period corresponding to the location of the person). The determination engine 353 may be configured to aggregate the extracted data collected by different image sensors based at least in part on a location and a line of sight of each of the image sensors. The aggregating the extracted data may comprise, identifying one or more pixels corresponding to the person in each of the images, determining a plurality of lines in a three-dimensional space, wherein each of the lines may be determined based on a position of one of the identified pixels in the image containing the pixel and the line of sight of the image sensor capturing the image, and determining one or more intersection areas of the lines. The determined intersection areas of the lines may be determined to be the location of the person. The determination engine 353 may use various triangulation methods to determine the intersection areas.

In some embodiments, the plurality of image sensors may correspond to a plurality of groups each comprising one or more of the image sensors. The aggregating the extracted data may comprise, processing the data collected by each group of image sensors to obtain analysis results, and aggregating the analysis results associated with the plurality of groups of image sensors. The division of image sensors into different groups and separate processing of data from each group may reduce processing power consumption and improve scalability of particular embodiments disclosed herein.

In some embodiments, the determination engine 353 may be configured to combine the extracted data with data collected by one or more other sensors (e.g., vibration sensors, weight sensors) to improve the performance of tracking persons. As an example and not by way of limitation, the determination engine 353 may further receive signals gathered by one or more vibration sensors beneath the floor of a store. The signals may be generated when a person walks by a corresponding sensor. The signals may be analyzed to extract one or more features identifying each person. The determination engine 353 may determine a location of a person based on the location of a sensor that collects vibration signals associated with the person. The determination engine 353 may compare such determination with a determination of the person's location using image data to find out the person's location in a more accurate manner. As another example and not by way of limitation, the determination engine 353 may receive data from a weight sensor placed near an entrance associated with a store. The data from the weight sensor may reflect a significant change each time a person enters the store. The determination engine 353 may thereby determine a total number of persons in the store. In particular situations, based on image data from various image sensors, the determine engine 353 may determine that it is ambiguous whether, in a particular region, there is one person or two persons in proximity to each other. The determine engine 353 may determine the number of persons in the region by checking the total number of persons in the store.

The determination engine 353 may be configured to determine a movement path of the person based on the location of the person in each of the time periods. The determined movement path of the person may be determined by connecting the determined locations of the person in the time domain. In some embodiments, a person may move out of the field of view of certain image sensors and into the field of view of certain other image sensors. The system 350 may be configured to adapt to such movement. In some embodiments, the determination engine 353 may be configured to determine that the person exits the field of view of one or more of the identified image sensors (e.g., identified by the extracting engine 352) and enters the field of view of one or more other image sensors, for example, adjacent or directly adjacent to the identified image sensors. The determination engine 353 may determine the person's locations from this point of time on based on data collected by one or more other image sensors, whose field of view encompasses the new locations of the person.

In some embodiments, the determination engine 353 may be configured to determine a plurality of possible locations of the person. The determination engine 353 may be configured to determine a probability value of each of the possible locations, that the person is actually present at each of the possible locations. The determination engine 353 may be configured to select one of the possible locations as the location of the person based at least in part on the probability values associated with each of the possible locations of the person. For example, the determination engine 353 may be configured to select a location with a highest associated probability value out of all the probability values. As another example, the determination engine 353 may be configured to select the location with the highest associated probability value only if the associated probability value is above (or equal to) a threshold. If the highest associated probability value is less than the threshold, the determination engine 353 may not select a location. The determination engine 353 may then determine or predict a location of the person based on data from other sensors (e.g., the one or more sensors 211, 212, 213, 221, 231, and/or 241).

In some embodiments, the determination engine may be configured to select one of the plurality of possible locations as the location of the person based at least in part on a previous movement path of the person. In a particular situation, the determination engine may have determined two possible locations of a person. One of the possible locations may be in proximity to a previous location of the person, indicating continuous movement of the person. The other location may include a substantial change to the location of the person in a short period of time. The determination engine 353 may choose the latter based on the previous movement path of the person.

In some embodiments, the system 350 may automatically recover from a loss of the location of a particular person. The system 350 may be configured to detect a failure of locating a person in a preceding time period, for example, because of being blocked or obstructed by a landmark, product, or another person in a field of sight of the one or more image sensors in the automated-checkout store, or because of a defect in one of the one or more image sensors. For the current point of time, the system 350 may re-identify one or more images that contain the person based on identified features of the person. The system 350 may identify one or more image sensors that have collected the data about the person in the current point of time and re-locate the person based on data collected by the identified image sensors.

Once a person inside the automated-checkout store is identified and a location of the person is determined, the analysis engine 354 may be configured to analyze the 3D rendering of motion of the person and determine actions that the person is taking, for example, reaching for an item on a particular shelf, placing the item into a shopping cart, or returning the item back to the particular shelf or another shelf.

The recording engine 355 may be configured to log and store all logged events for each person in the automated-checkout store. For example, the recording engine 355 may be configured to log and store all logged events for each person in a database or table, to acquire a historical record of each of its customers, as described with regard to real time layer 320.

Figure 4:
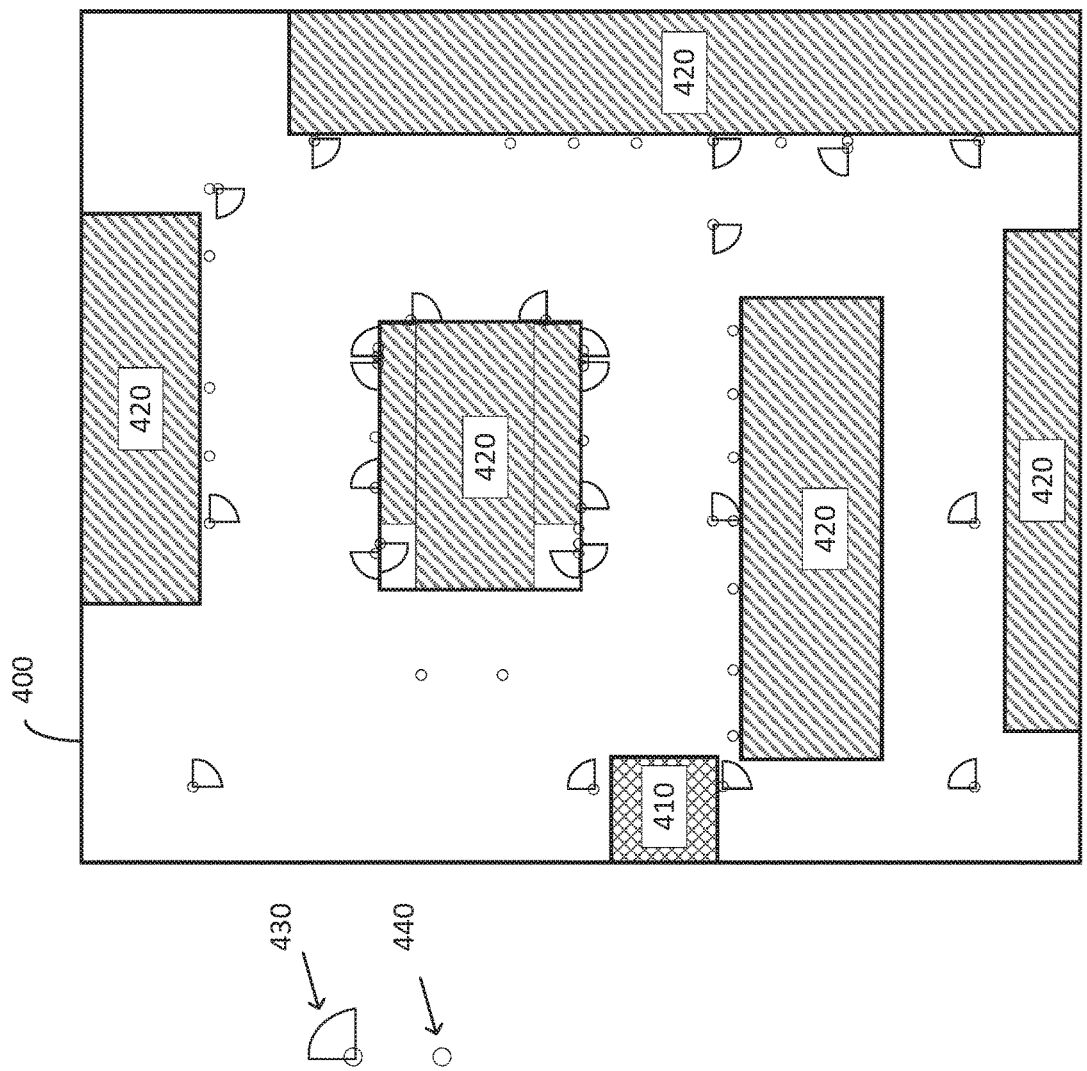
FIG. 4 illustrates an example sensor system in an automated-checkout store.

FIG. 4 illustrates an example sensor system 400 in an automated-checkout store. Illustrated by FIG. 4 may be an inner space of an automated-checkout store. FIG. 4 may include an entrance, exit, or fixture 410, one or more shelves 420, one or more tracking cameras 430, and one or more depth cameras 440. In some embodiments, no depth cameras 440 may be necessary for or used in the system. As an example, the one or more tracking cameras 430 may comprise RGB cameras or IR cameras. The one or more tracking cameras 430 and/or the one or more depth cameras 440 may be implemented as part of, controlled, or coordinated by a computer system, which may be implemented, for example, as system 300, as shown and described in FIGS. 3A-3B. The sensor system 400 may comprise a hierarchical, modularized sensor system in which the one or more tracking cameras 430 and/or the one or more depth cameras 440 may be divided into groups. Each of the groups may comprise one or more image sensors configured to capture and/or monitor a section of the automated-checkout store. Data collected by each group may be separately processed and analyzed by a computer sub-system comprising one or more processors (e.g., CPUs, GPUs). Then, the results of various computer sub-systems may be combined and derive results covering an entire space. Such a modularized design saves processing power using separate and parallel processing of data from the image sensors. With such a modularized sensor system, a complexity of a tracking a certain area may grow linearly with the size of the area, instead of squared or higher growth. Image sensors arranged in such a modularized manner may provide high scalability for large shopping spaces. The computer system for such a sensor system 400 may use a unique identifier for each person in the area monitored by the sensor system 400 across different groups of sensors. The computer system may determine locations of persons using a machine-learning model based on data collected by the image sensors 430 and 440. The sensor system 400 may determine and/or output the locations where the persons are present, for example, as bounding boxes.

Each of the tracking cameras 430 and the depth cameras 440 may comprise a field of view in which people and/or objects may be captured and/or monitored. Some of the tracking cameras 430, such as tracking cameras 430 that neighbor each other, may have fields of view with overlapping portions. In some embodiments, the tracking cameras 430 may or may not have fixed locations. The tracking cameras 430 may be automatically calibrated such that if a location of a tracking camera 430 is changed, the tracking camera 430 may automatically and/or dynamically detect its updated location. As an example, the tracking cameras 430 may be calibrated by detecting an object moving along a route and feature points on the object by multiple tracking cameras 430. The tracking cameras 430 may capture a first set of one or more images of the feature points of the object moving along the route by a first tracking camera 430 and a second set of one or more images of the feature points of the object moving along the route by a second tracking camera 430 and recording a time stamp for each capture. The tracking cameras 430 may be calibrated by matching common feature points of the object from the first set and the second set of the images.

At the entrance, exit, or fixture 410 of the store, the computer system may identify an account associated with a person who enters the store. In some embodiments, the computer system may determine that a person enters the store based on signals from one or more of the sensors such as, for example, a tracking camera 430 pointing at the door of the store or a weight sensor below the floor near the door. In some embodiments, the computer system may identify an account associated with the person based on information provided by the person. For example, the person may be required to swipe a credit card or provide login information before being granted access to the store. The computer system may identify the account associated with the person based on information associated with the credit card or the login. In some embodiments, the computer system may determine an account based on a determined identity of the user. The computer system may determine the identity of the person based on data received from one or more of the sensors, such as tracking cameras 430. The received data may be fed into a machine-learning model, such as a deep learning network, a feature matching model, and/or a combination of one or more neural networks, for determining an identity of users. The model may comprise features corresponding to characteristics such as facial, body, or hair features, clothing of the person, measurements of the person such as height or weight, a distinctive gait or walking style of the person, and/or other suitable features specified by human or generated by machine-learning algorithms, or any combination thereof. The machine-learning model may have been trained by real-world data or data generated by simulations. For example, the training data may be generated by modifying real-world images by changing a background or environment in which a person is located to be a plurality of options. The training data may be tested and verified. The collected data may be compared with data stored by or otherwise accessible to the computer system that correlate accounts or identities of persons with characteristics of their appearance. In this manner, the account associated with the person may be identified without input from the person.

The computer system may obtain data on movement of a product item on a shelf 420 of the automated-checkout store collected by one or more of the sensors (e.g., the one or more sensors 211, 212, 213, 221, 231, and/or 241). The movement of the product item may indicate that an event has occurred to the product item. The event may comprise, for example, a product item being picked up by a person, a product item being placed in a shopping cart, a product item being placed back on a shelf 420, another suitable event, or any combination thereof.

The computer system may determine an interaction between the person and the product item based on data collected by one or more of the sensors. In some embodiments, to determine an interaction between the person and the product item, the computer system may determine, based on data received from one or more of the sensors, that the person is located in proximity to the product item in a period of time. The computer system may then detect one or more movements of a hand of the person with respect to the product item and determine the interaction based on the one or more detected movements. In some embodiments, the computer system may perform gaze-tracking or eye-tracking on a person, based on which the computer system may determine one or more product items that the person is looking at. For example, one or more IR cameras 430 may be placed on a shelf 420 and be configured to catch light reflected from eyes (e.g., retinas) of the person. Based on data associated with the captured light, the computer system may determine a direction of the gaze of the person, thus determining one or more product items that the person is looking at.

In some embodiments, the computer system may be configured to utilize machine-learning models to keep track of inventory of product items and people interacting with the product items. The computer system may receive data from a plurality of sensors and apply the data to machine-learning models. The different sources may include digital images or videos from an array of cameras (e.g., tracking cameras 430) mounted in various parts of a retail store, such as the ceiling, cashier level, shelf level cameras (e.g., tracking cameras 430), signals from weight sensors, force sensors and vibration sensors on shelves 420. The different types of data may be used to train the machine-learning model, and allow the machine-learning model to learn and recognize actions performed by customers in the retail environment and label these actions for future recognition. In addition to currently-received sensor data, the computer system may also consider previously-received data in determining the interaction. In particular, the computer system may calculate a conditional probability of a particular activity of a person based on prior detected activities of the person.

In some embodiments, digital images and video may be used with the support of other types of sensors to recognize the interaction between persons and product items placed in various areas of the store. The computer system may be configured to recognize consumer shopping behavior by estimating a three-dimensional (3D) location of a person's hand using digital images captured by the array of cameras (e.g., tracking cameras 430). The recognition may be used by the machine-learning algorithm to recognize and provide a probability of various shopping behavior of the person in the retail environment. The shopping behavior may include the motion of a person's body, arms, or hands in an action of removing a product item from a shelf 420 or returning the product item to the shelf 420.

In some embodiments, a plurality of image sensors may be used to predict the 3D location of body joints. Red-green-blue (RGB) cameras 430, as well as infrared (IR) image sensors (e.g., cameras 430) may be used to capture two-dimensional (2D) images. The 2D images may be analyzed to obtain 3D locations. Alternatively or additionally, one or more depth cameras 440 may be used to determine the depth of a body joint into an area containing a product item. The one or more depth cameras 440 may be used jointly with the other cameras (e.g., tracking cameras 430) to estimate the 3D locations of a person's body joints. The 3D hand location of the consumer may be estimated using digital images or video.

In some embodiments, the computer system may use the image data in conjunction with data received from weight sensors and location aware pressure sensors to predict a quantity and type of product items interacted with by the person. The machine-learning algorithm may be trained to connect and recognize certain motions of the person with changes in the placement of the product items. For example, the array of cameras (e.g., tracking cameras 430) may capture the person reaching for a product item on the shelf 420. The machine-learning model may be trained to recognize, through the analysis of 3D motions of the person, the motion of the body joints of a consumer which leads to the consumer reaching for the product item placed on the shelf 420. Using the analysis of the 3D motion alone, the machine-learning algorithm may not be able to obtain a probability of the retail product removed with high confidence if the consumer removed an item from the back of the shelf 420, or out of the range of the array of cameras (e.g., tracking cameras 430). The computer system may obtain data from the weight sensors or location aware pressure sensors to determine a change in the weight or pressure of a particular bin of the shelf 420 to aid in identifying the retail product removed from the smart shelf system with higher confidence.

In some embodiments, the computer system may use data collected by one or more weight sensors or one or more capacitive sensors to determine movement of a product item caused by interaction of a user. As an example and not by way of limitation, one or more load cells using resistive strain gauges may be fixed to one or more beams associated with a shelf 420. A force applied to the beam may cause a change to the resistance of the strain gauge, thus generating a voltage output. The voltage output may be proportional to the force. The voltage output may be communicated to the computer system through an interface circuit. In this manner, weights of product items placed on different areas of the shelf 420 may be detected. As another example and not by way of limitation, an array of capacitance-sensing elements (e.g., using capacitive sensors) may be placed on a shelf 420. Because product items have different dielectric constants from air, placing a product item on the shelf 420 may generate a change to the capacitance sensed by one or more of the capacitance-sensing elements. The change to the capacitance may depend on the material of the product item. A footprint of a product item (e.g., an image corresponding to the shape of a bottom surface of the product item, magnitude of signal corresponding to the material of the product item) may be generated based on data collected by the capacitance-sensing elements. Furthermore, a person touching a product item may also cause a change to the capacitance signal. In some embodiments, a shelf 420 may be configured to sense weight and capacitance by integrating weight-sensing load cells with a capacitance-sensing surface. Alternatively, a capacitance-sensing surface may be made weight-sensitive by incorporating a material that changes in capacitance based on force felt. In some embodiments, the computer system may detect movement of a product item, a location of the product item that is moved, or a person's touching the product item based on signals received from the weight sensors and capacitive sensors.

In some embodiments, the computer system may further use data collected by one or more vibration sensors to determine an interaction between a person and a product item. The computer system may comprise a frequency-feature based extraction algorithm to detect an onset of a vibration signal. The system may use visual signals from cameras (e.g., tracking cameras 430) to assist to identify a product. For example, when a particular product item is picked up, the event may generate a particular vibration frequency, which may be recorded by one or more vibration sensors. Based on identification of the product item by one or more image sensors or one or more other sensors, the system may associate the particular frequency signature with the particular product items. The system may subsequently use the frequency signature to identify the event that this particular product is picked up.

A frequency-feature based extraction algorithm may also be utilized to track and monitor people's behaviors. The system may be configured to sense and analyze vibration caused by human interactions in the store. For example, vibration of the ground, the sound created by footsteps, the opening and closing of cold storage doors, shopping cart usage, pattern of picking up or putting back product, etc. may be detected and analyzed by the vibration sensors. These vibration signals, coupled with visual recordings from image sensors, may be used to extract a customer's behavior characteristics. When a person is in a blind spot, or changes her appearance, such that the system has difficulties to identify the person based on image data, the system may use the vibration signals to re-identify the person.

In some embodiments, the computer system may determine, based on data received from one or more of the sensors, a movement path within the automated-checkout store associated with the person. In some embodiments, the computer system may identify one or more features (e.g., appearance features of face, body, or cloths, visual patterns of walking, vibration frequency signature when walking) associated with the person and use the features to track the movement of the person. In some embodiments, the space within the automated-checkout store may be divided into a plurality of regions, each monitored with a set of image sensors (e.g., four cameras such as tracking cameras 430 at the corners of a rectangular region) and/or one or more other sensors. The person's movement path in each region may be separately tracked by the sensors corresponding to the region. The tracking results for different regions may then be integrated by concatenating overlapping areas and optimizing from the perspective of the entire store perspective. Based on the data collected by the sensors, the computer system may construct a model describing the 3D movement of the person. In some embodiments, one or more piezoelectric sensors or piezo film sensors may be used in conjunction with image sensors to determine a person's movement path within the automated-checkout store. The piezo film sensors may be embedded in the floor of the automated-checkout store (e.g., in one or more floor tiles). The piezo film sensors may generate electrical signals in response to steps of a person. The computer system may determine a trajectory of the person based on signals from a plurality of piezo film sensors located in a plurality of locations within the automated-checkout store.

In some embodiments, data of people trajectory and body key points can also be collected for video analysis to help optimize store layouts and personalized product recommendation. Global optimization can be performed to integrate data from different sensors. For example, total number of people in the store can be detected by monitoring how many people enter through the door. The total number of people in the store can be used in global optimization. For example, two modules may have disagreements on two people images close in distance. If the two images are counted as two people, the total number of people in store may be more than the total number entering the store counted by the system. In that case, the global optimization can be performed to count those two images as one person.

In some embodiments, the computer system may store information associating the product item with the person. In some embodiments, based on the determined interaction between the person and the product item, the computer system may determine that the person has taken the product item in possession with an intent to purchase the product item. The information associating the product item with the person may indicate that the product item will be purchased by the person. In some embodiments, another determined interaction between the person and the product item (e.g., placing the product item back on a shelf 420) may indicate that the person intends to return the product to the store. In this case, the computer system may remove the stored information associating the product with the person or store additional information indicating that the product item is has been returned by the person.

In some embodiments, the computer system may recognize an identity of the product item that is interacted with in order to associate the product item with the person. In some embodiments, the computer system may extract, from data received from one or more of the sensors, one or more features associated with the product item. The features may comprise a weight, a shape, a color, a surface force image, a position, or a conductivity. The computer system may then determine, using a machine-learning model, an identity of the product item based on one or more of the extracted features. In some embodiments, for product items that are difficult to distinguish based on the external characteristics (e.g., clothes, electronics) or product items that are of particular importance (e.g., expensive or luxury products), the automated-checkout store may use other suitable methods to verify the identity of the product item. For example, RFID tags may be applied to the product items. The store may further comprise one or more RFID sensors to read the RFID tags and determine the identities of the product items.

In some embodiments, characteristics of product items such as weight, visual appearance, surface force image, and conductivity may be used to identify the product. Information about such characteristics of each product may be stored in the computer system. For a product item interacted with by a person, one or more sensors may collect information about such characteristics of the product item. For example, one or more cameras, such as tracking cameras 430, may capture images (e.g., RGB images, images with depth information) of the product item. As another example, one or more weight sensors, capacitive sensors, and/or force sensors may collect information about the weight, shape, conductivity, and surface force image of the product item. The conductivity information may be used to determine the type of material which makes up at least a part of the product. The surface force image may be used to determine footprint of the retail product and the force exerted by the surface of the product.

In some embodiments, data from different sensors may indicate different identities of a product item. The computer system may determine one of the identities based on a confidence score associated with each identity. For example, the computer system may determine, based on data received from a first sensor, a first identity for the product item associated with a first confidence score. The computer system may determine, based on data received from a second sensor, a second identity for the product item associated with a second confidence score. The computer system may select one of the first identity and the second identity as the identity of the product item based on a comparison of the first confidence score and the second confidence score.

In some embodiments, for a characteristic of a product item that may take a value within a range, the computer system may determine the value based on a combination of data from different sensors. For example, the computer system may obtain, based on data received from the sensors, a plurality of values associated with a characteristic of the product item. Each of the values may be determined based on data received from one of the sensors. The computer system may determine a final value corresponding to the characteristic based at least in part on a weighted average of the plurality of values. The weight assigned to each value may be based on a confidence score associated with the sensor corresponding to the value.

The computer system may deduct a payment amount from the identified account, wherein the payment amount is based on a price of the product item associated with the person. In some embodiments, the computer system may obtain a price for each product item that has been interacted with by the person (e.g., picked up and placed in a shopping cart). When the person is exiting the automated-checkout store, the computer system may generate a list of product items purchased by the person, itemized prices, and a total amount to be paid by the person. The itemized receipt may be displayed or printed out for the person by a kiosk or another suitable electronic device (e.g., an iPad). The itemized receipt may also be sent to the person by, for example, emails or text messages. The total amount may then be charged to the account associated with the person. In some embodiments, based on input of the person (e.g., swipe of a card, login information) or pre-stored information, the computer system may obtain and hold a token associated with the person, which may be provided to a third-party payment service provider to charge the person. In some embodiments, the computer system may keep any information about the person without uploading the information to the cloud but only transmit a token associated with the person to an external system. In this manner, the computer system may protect the privacy of the person.

Figure 5A:
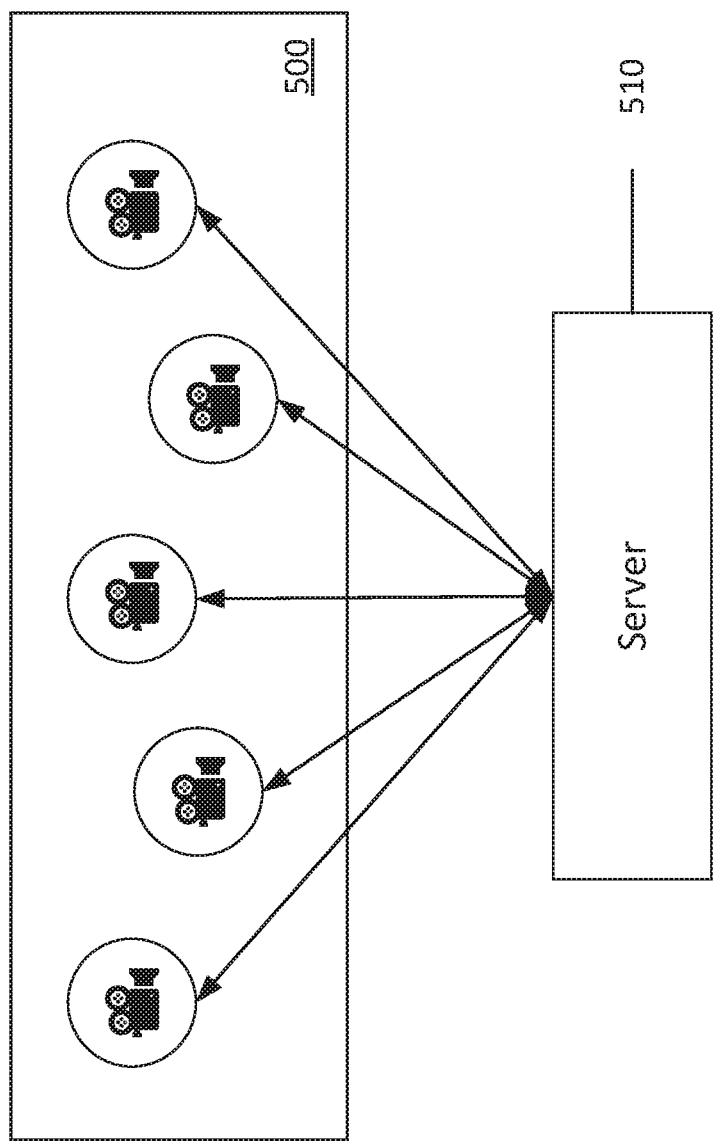
FIG. 5A illustrates an example system for tracking objects in an automated-checkout store.

FIG. 5A illustrates an example system for tracking objects in an automated-checkout store. The system may include a plurality of sensors 500 that collect data associated with persons shopping in the store, and a server 510 that receives, processes and analyzes the collected data. The sensing layer 310 and real time layer 320 illustrated in FIG. 3A may be implemented using one or more components of the system illustrated in FIG. 5A. Specifically, the sensing layer 310 may be implemented using the sensors 500, and the real time layer 320 may be implemented using the server 510. The sensors 500 may include image sensors (e.g., RGB cameras, IR cameras, depth cameras, video cameras), weight sensors, pressure sensors, etc. The data collection by the sensors 500 may be continuous, event-triggered, periodical, or in another suitable manner. The data collected by the sensors 500 may include information associated with a person in the store, such as appearance, location, hand position, hand motion, etc., as well as information associated with product items that are in the proximity of the person's hand, such as shape, color, weight, bar code, etc. In some embodiments, the information associated with the product items may be collected only when a triggering event is detected. For example, the information may be collected when a weight change is detected on the shelf or a container holding the product items (the weight change may indicate that an item is taken), when some image sensors detect that the person is in proximity to a shelf or one or more product items, or when some image sensors detect the person's hand motion such as reaching, grabbing, placing, holding, etc.

In some embodiments, the server 510 may be an on-premises computer, a gateway device that connects to a remote server or a cloud service, a computing device with storage capacity, other suitable computing devices, or any combination thereof. There may be a plurality of such servers that work collectively as one logical server. As shown in FIG. 5A, the system uses a two-layer architecture for data collection, processing, and analysis, with the first layer (e.g., the sensors 500) for data collection and the second layer (e.g., the server 510) with computing power and storage capacity for data processing and analysis. In some embodiments, the sensors 500 may transmit raw data to the server 510 for processing, such as high-resolution images or videos. In other embodiments, the sensors 510 may perform some preliminary processing work on the raw data before transmitting it to the server 510, such as image compression or video compression. The preliminary work may reduce the volume of data to be transmitted to the server 510. In other embodiments, the sensors 510 may perform other preliminary work for other suitable purposes. In some embodiments, the sensors 500 may receive control commands from the server 510, such as reboot, zoom in, zoom out, adjust angle, power on, power off, update firmware, update stored data (e.g., machine learning models), etc.

Figure 5B:
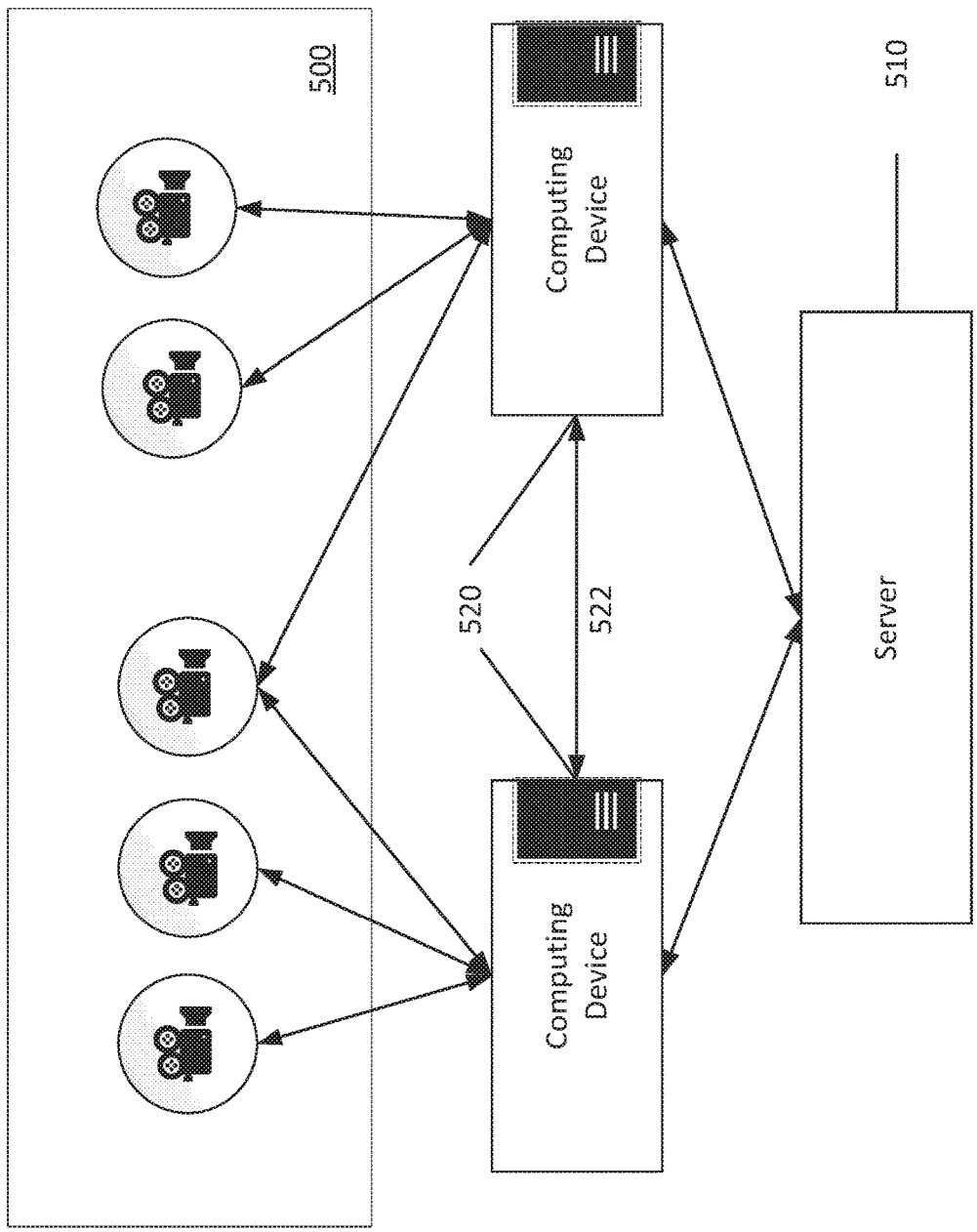
FIG. 5B illustrates another example system for tracking objects in an automated-checkout store.

FIG. 5B illustrates another example system for tracking objects in an automated-checkout store. The system may include a plurality of sensors 500 that collect data associated with persons shopping in the store, one or more computing devices 520, and a server 510. The sensing layer 310 and real time layer 320 illustrated in FIG. 3A may be implemented using one or more components of the system illustrated in FIG. 5B. Specifically, the sensing layer 310 may be implemented using the sensors 500, and the real time layer 320 may be implemented using the computing devices 520 and the server 510. The one or more computing devices 520 may receive, process and analyze the data collected by the sensors 500, while the server 510 may receive the processed data from the one or more computing devices 520 and perform further operations on the data such as aggregating, synthesizing, or logging. The computing devices 520 may be equipped with computing and storage resources to carry out sophisticated operations such as object identification (including recognition, detection) to identify objects, feature extraction from the identified objects, etc. In comparison to the two-layer architecture shown in FIG. 5A, the three-layer architecture shown in FIG. 5B may offer better performance by further distributing data collection, processing and analysis.

In some embodiments, a computing device 520 may be placed close to the sensors 500 so that the connection between them is stable and fast. For example, the computing device 520 may use cable to directly connect to the sensors 500 for a fast speed of data transfer (e.g., using CAT6 or CAT5e cable for wired Ethernet connection) and a tamper-resistant or tamper-proof connection. In some embodiments, one of the computing devices 520 may be assigned to process only the data collected from a predetermined group of sensors 500. For example, if the store has multiple separated sections (e.g., rooms, aisles, areas) that may be monitored separately, the data collection from these sections may occur in parallel, and the corresponding data processing tasks may be assigned to one or more computing devices 520 for parallel processing.

In some embodiments, after the computing devices 520 processed the data received from the sensors 500, the processed data may be transmitted to the server 510 for aggregation and further analysis. For example, a group of sensors 500 may send the collected raw data (high-resolution images or videos) to an assigned computing device 520 via a fast and reliable connection for process. Accordingly, the computing device 520 may use a predetermined machine-learning model to detect objects from the images or videos and extract information (such as a plurality of features) associated with the objects. Based on the extracted information, the computing device 520 may create a digest and transmit the digest to the server 510 for further process. In some embodiments, the computing device 520 may exchange information with peer computing devices 520 via the network connection 522 in order to improve accuracy, address blind spots, cross-training object detection models, another suitable purpose, or any combination thereof. For example, the sensors associated with multiple computing devices 520 may collect data of an object from different angles. The data may need to be aggregated in order to build a complete view of the object. As another example, the view of the sensors associated with one computing device 520 may be blocked by temporary obstructions (e.g., an employee restocking the shelves). To address this type of blind spots issues, the computing device 520 may need to retrieve data from another computing device 520 using a different group of sensors. As yet another example, a first computing device 520 may determine an object as a bottle of water with 60% confidence score and a bag of chips with 40% confidence score, while a second computing device 520 observing the same object may determine it as a bottle of water with 95% confidence score and a bag of chips with 5% confidence score. In this case, the first computing device 520 may request the related data from the second computing device 520 and re-train its object identification model to improve accuracy.

In some embodiments, the computing device 520 may exchange information with the server 510. For example, the computing device 520 may receive a machine-learning model trained or prepared by the server 510 and use such model for object identification. As another example, a computing device 520 may receive from the server 510 information associated with a plurality of features and an identifier, such as the features of a product and the product's identity (e.g., an identifier), or the features of a person and the person's identity (e.g., an identifier), etc. With this information, the computing device 520 may determine that the received identifier corresponds to one of the objects identified based on comparing the received features with the extracted features associated with the object. The computing device 520 may include the identifier in the digest to be sent to the server 510. By doing this, the receiver of the digest (e.g., the server 510) does not need to process the features to calculate the identifier again. In this way, the computing devices 520 may offload computation tasks from the server 510 to reduce resource consumption (e.g., computing power).

In some embodiments, the computing devices 520 may receive commands from the server 510 to control the sensors 500, such as reboot, zoom in, zoom out, adjust angle, power on, power off, update firmware, update stored data (e.g., machine learning models), etc. The computing devices 520 may forward the commands to the sensors to execute the commands. In some embodiments, the server 510 may send the commands directly to the sensors 500 for execution.

In comparison to the system shown in FIG. 5A, the system shown in FIG. 5B may also reduce setup complexity by, as an example, saving the total amount of cables to deploy a tracking system in a store. For example, within a store of a reasonable size, it may be impractical or costly to use wired/cable connection to connect all the sensors 500 and the server 510. Furthermore, alternative solutions such as using wireless connection may compromise the data transferring speed as well as the stability of the connections. The three-layer architecture shown in FIG. 5B may allow each computing device 520 to be placed close to a group of sensors to form a working group and using wired/cable connection within the working group. The stable connection within the working group may facilitate transfer of sensor data (e.g., raw data, which are likely large in size) from the sensors 500 to the computing device 520 that may demand for the highest transferring speed. In some embodiments, the connection between the computing devices 520 and the server 510 may be wireless or wired. Wireless connection between the computing device 520 and the server 510 may be acceptable as the amount of data to be transferred between them may be modest (e.g., digests generated from the raw data).

Figure 5C:
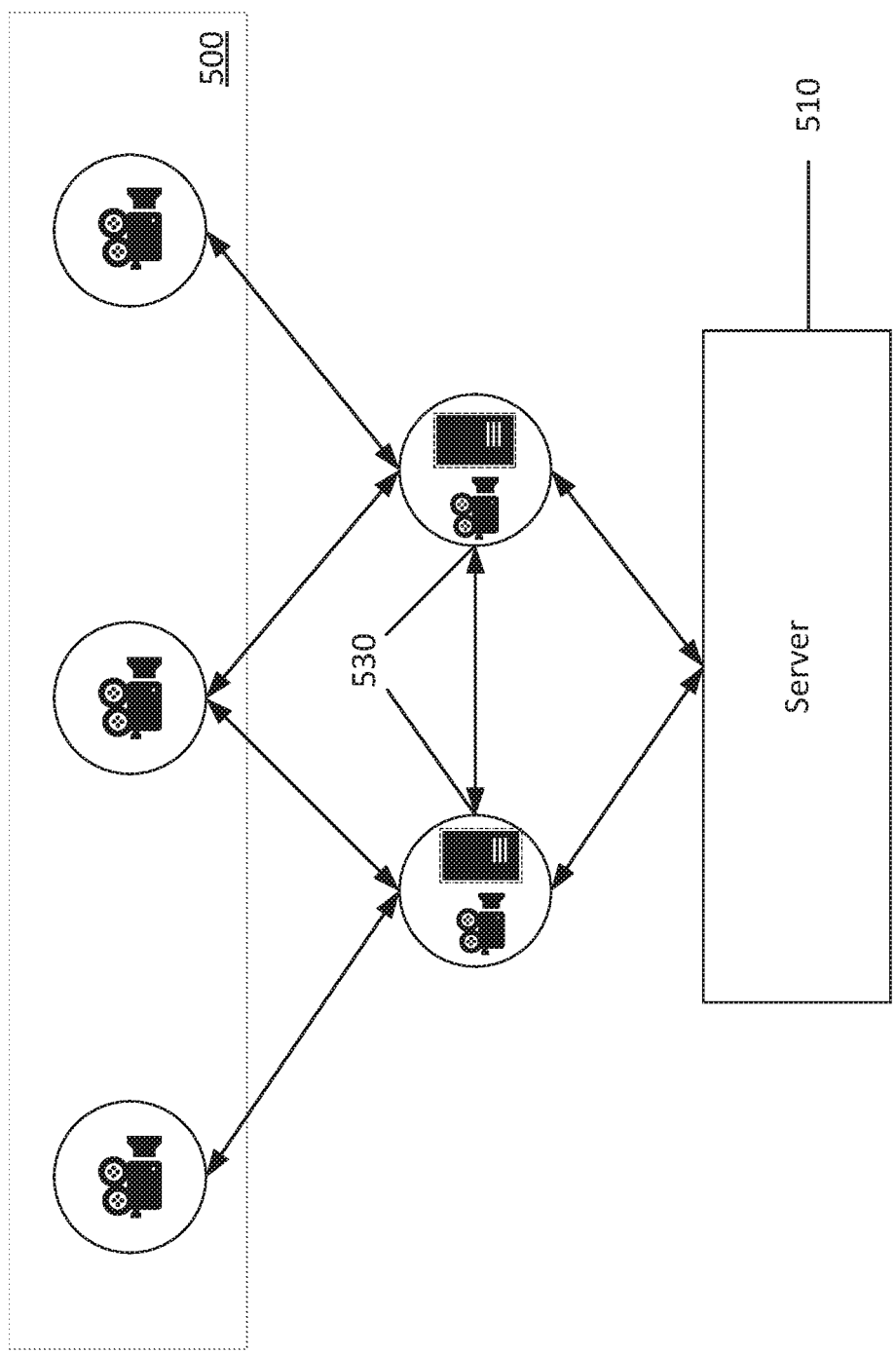
FIG. 5C illustrates yet another example system for tracking objects in an automated-checkout store.

FIG. 5C illustrates yet another example system for tracking objects in an automated-checkout store. The system may comprise a plurality of sensors 500, one or more sensors with computing and storage capacity 530, and a server 510. The sensing layer 310 and real time layer 320 illustrated in FIG. 3A may be implemented using this system. Specifically, the sensing layer 310 may be implemented using the sensors 500 and the sensors/computing devices 530, and the real time layer 320 may be implemented using the computing devices 530 and the server 510. In some embodiments, the plurality of sensors 500 may be resource restrained and considered as light nodes. These light nodes may be only responsible to collect data and send the collected data out to a computing device for further processing. In some embodiments, the light-node sensors 500 may perform preliminary operations such as data compression to reduce the volume of data to be transferred. In some embodiments, some sensors 530 may be equipped with sufficient computing power and storage capacity on top of their sensor functionalities, and considered as full nodes or smart nodes. These full-nodes sensors 530 may receive data from light nodes and other full nodes. The received data may be synthesized with the data locally collected. In some embodiments, the full-node sensors may perform sophisticated data processing operations on the data, such as identifying object using machine-learning models, extracting features of the identified objects, another suitable operation, or any combination thereof. Based on the extracted features of the identified objects, the full nodes 530 may create a digest and transmit only the digest to the server 510 for further processing.

Figure 5D:
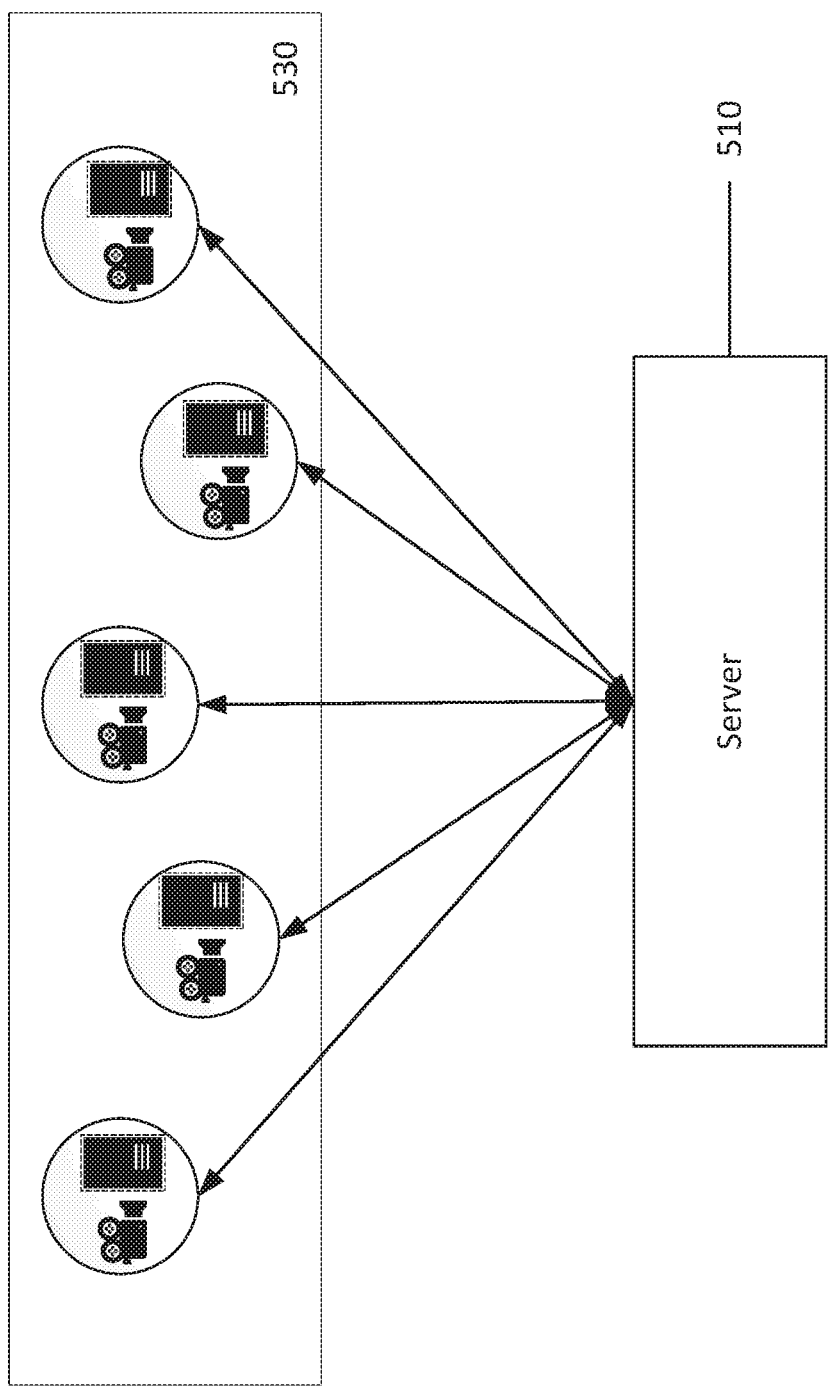
FIG. 5D illustrates still another example system for tracking objects in an automated-checkout store.

FIG. 5D illustrates still another example system for tracking objects in an automated-checkout store. In some embodiments, the store may equip the sensors 530 with computing resources and storage capacities so that the raw data collected by these sensors can be processed locally without being transferred around. The sensing layer 310 and real time layer 320 illustrated in FIG. 3A may be implemented using this system. Specifically, the sensing layer 310 may be implemented using the sensors 530, and the real time layer 320 may be implemented using the server 510 and the sensors 530 by leveraging their computing capabilities. In some embodiments, the sensors 530 may perform object detection and feature extraction from the detected objects. Based on the extracted features, the sensors 530 may create a digest and transmit only the digest to the server 510 for further processing. In some embodiments, a sensor 530 may also receive from the server 510 information associated with a plurality of features and an identifier, such as the features of a product and the product's identifier, or the features of a person and the person's identifier. With the information of the features, the sensor 530 may determine that the received identifier is associated with an object when the received features match the extracted features of the object. Afterwards, the sensor 530 may include the identifier in the digest to be sent to the server 510. In this way, the server 510 may save the computing cost for the features-to-identifier recognition. In some embodiments, these sensors 530 may offload certain computation tasks from the server 510 to the sensors 530 in order to reduce resource contention (e.g., computing power), and the volume of data to be transferred to the server 510. In some embodiments, the sensors 530 may receive control commands from the server 510 such as reboot, zoom in, zoom out, adjust angle, power on, power off, firmware update, and data update (e.g., updating the machine learning model).

In some embodiments, the devices shown in FIGS. 5A-5D may be logically organized into a hierarchical model. For example, the devices in the systems shown in FIGS. 5A-5D may be classified into three tiers: a leaf tier comprising nodes collecting data (e.g., the sensors 500), an edge tier comprising nodes receiving the collected data from the leaf tier and perform certain data processing operations (e.g., the computing devices 520), and a root tier comprising nodes aggregating processed data from the edge and leaf tiers and further perform necessary operations (e.g., the server 510). In some embodiments, the nodes in the leaf tier may be grouped according to locations, with each group collecting data from one small region. For example, a group of image sensors (one group may comprise one or more sensors) may be collectively monitoring a shelf, while another group of image sensors may be collectively monitoring an entrance area. In some embodiments, a node may be reconfigured (e.g., adjusting angle, changing location) and moves from one group to another group. In some embodiments, the nodes in the edge tier may be grouped according to functionalities, such as product item recognition, people tracking, person-product interaction detection, another suitable functionality, or any combination thereof. One edge node may be configured to perform one or more functionalities. In some embodiments, while a group of leaf nodes (e.g., image sensors) may handle data corresponding to a small region, an edge node in the edge tier may process the data collected from a plurality of groups of leaf nodes (e.g., corresponding to one or more regions). As a result, the edge node may process data from a larger region. In some embodiments, a leaf node in the leaf tier may be equipped with computing and storage capabilities to perform certain preliminary data processing on the data locally collected (e.g., performing compression on the images or videos collected by the leaf node itself or by its peers). In some embodiments, the systems shown in FIGS. 5A-5D may use hierarchical architectures comprising more than three tiers. For example, a group of nodes in the lowest level of the architectures may handle a small region, and send stream the output (e.g., collected sensor data) to one or more higher-level nodes that are responsible for a larger region, and so on.

Figure 6A:
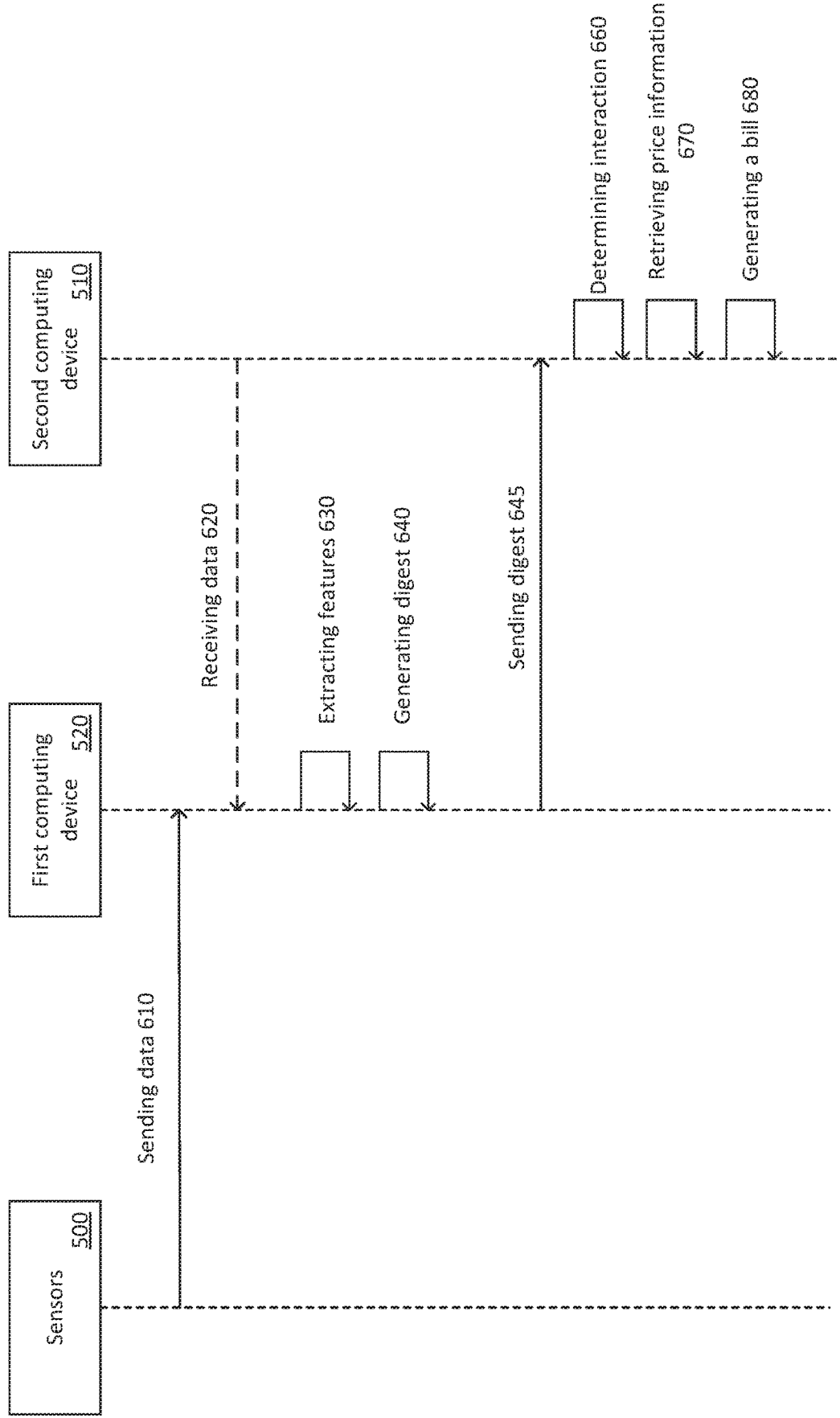
FIG. 6A illustrates an example method for tracking objects in an automated-checkout store.

FIG. 6A illustrates an example method for tracking objects in an automated-checkout store. The method may start from step 610, where a plurality of sensors 500 may send sensor data to a first computing device 520. The plurality of sensors 500 may include one or more image sensors (e.g., RGB cameras, IR cameras, depth cameras, video cameras). The first computing device 520 may be equipped with computing and storage resources to execute operations such object identification to identify objects, and feature extraction from the identified objects. In some embodiments, the first computing device 520 may comprise a computer, a smart device, a sensor, another device with computing resource (such as CPU, GPU, or ASIC, etc.) and storage capacity (such as volatile memory, non-volatile memory), or any combination thereof. In some embodiments, the first computing device 520 may optionally have persistent storage capability.

In some embodiments, the first computing device 520 may be placed close to the sensors 500 in order to establish a reliable connection (e.g., using wired connection that provides stable connectivity and max data transfer speed). For example, the first computing device 520 may use CAT6 or CAT5e cable for wired Ethernet to directly connect to the sensors 500. In some embodiments, the first computing device 520 may be associated with a predetermined group of sensors 500 and only process the data collected by the sensors 500 in the group. For example, if the store has multiple separated sections (e.g., rooms, aisles, areas) that may be monitored separately, the data collection from these sections may occur in parallel, and the corresponding data processing tasks may be assigned to one or more first computing devices 520 for parallel processing. By doing so, the data transfer between the sensors 500 and the first computing devices 510 may use a stable and fast connection, while the data processing tasks are also distributed and parallelized among the one or more computing devices to offer faster responses.

In some embodiments, the first computing device 520 may receive data from a second computing device 510 at step 620. For example, if the second computing device 510 is a server, the first computing device 520 may receive a machine-learning model trained or otherwise prepared by the server, and use the model for object identification. As another example, the first computing device 520 may receive mapping information between a plurality of features and an identifier from one or more second computing devices 510 (e.g., a server, or a peer device of the first computing device 520). The plurality of features may include the features of a product and the product's identity (e.g., an identifier), the features of a person and the person's identity (e.g., an identifier), or any combination thereof. In some embodiments, the features and identifiers may be encrypted or encoded. With the mapping information, the first computing device 520 may determine that an object to be identified is associated with the identifier if the extracted features of the object match the received features. In this way, the first computing device 520 may save the computing cost of features-to-identifier determination. Furthermore, the first computing device 520 may include the identifier in the digest rather than the appearance features in the digest, which may further reduce the size of the data to be transferred. In some embodiments, the mapping information may be associated with number of votes (e.g., the number of computing devices have agreed with the mapping). The mapping information may be used by a computing device when a consensus has been reached regarding the accuracy of the mapping (e.g., when the number of votes associated with the mapping is greater than a predetermined threshold).

In some embodiments, the first computing device 520 may extract a plurality of features from each of detected objects at step 630. In some embodiments, the plurality of features associated with an object may be sufficient for the computer system to identify such object. For example, the first computing device 520 may extract, from data collected by one or more of the sensors 500, features associated with a product item, including a weight, a shape, a color, a surface force image, a position, or a conductivity. In another example, the first computing device 520 may extract, from data collected by one or more of the sensors 500, features associated with a person (e.g., a customer), including facial, body, or hair features, clothing of the person, measurements of the person such as height or weight, a distinctive gait or walking style of the person, position information, and/or hand motion. The identification of persons and product items is described in further details herein at least with regard to FIGS. 3A, 3B and 4.

In some embodiments, the first computing device 520 may, based on the extracted features associated with each detected object from the data collected by the sensors 500, generate a digest at step 640. In some embodiments, the digest may include a mapping relationship between each detected object and the corresponding features. In some embodiments, the first computing device 520 may generate the digest periodically (e.g., every second, or every minute), or in another suitable manner. In some embodiments, the first computing device may send the generated digest to a second computing device for further processing at step 645. In some embodiments, the first computing device 520 may perform preliminary operations on the extracted features before sending it out. For example, the first computing device 520 may encrypt or encode the features for privacy protection. As another example, the first computing device 520 may aggregate the extracted features and perform actions like data deduplication to reduce the size of data to be included in the digest. In some embodiments, sending a digest instead of the raw data collected by the sensors 500 may offload computing-intensive tasks from a central server to the one or more first computing devices 520, and reduce the volumes of the data to be transferred to the central server, while maintaining the same or similar quality of the information to be communicated to the central server.

In some embodiments, the second computing device 510 may be a centralized server that aggregate the digests from one or more first computing devices 520. In some embodiments, the second computing device 510 may further extract features associated with a plurality of objects from the aggregated digests to determine interactions at step 660. For example, the features of a person (such as the person's hand motion) may be associated with the features of a product item (such as the weight change of the container holding the product item, the position change of the product item) that the person interacted with. In some embodiments, the second computing device 510 may offload the interaction determination (step 660) task to the first computing device 520 to perform. For example, the first computing device 520 may receive sensor data associated with both the person and the product item at step 610. After extracting the corresponding features at step 630, the first computing device 520 may determine interaction and include the determined interaction in its digest to be sent at step 645.

In some embodiments, the second computing device 510 may generate a bill for the person based on the determined interactions between the person and the one or more product items. For example, the second computing device 510 may retrieve the price information of the product items determined as removed by the person from a database at step 670, and generate a bill or itemized receipt for the person at step 680. In some embodiments, the price information may be collected by the store during inventory management.

Figure 6B:
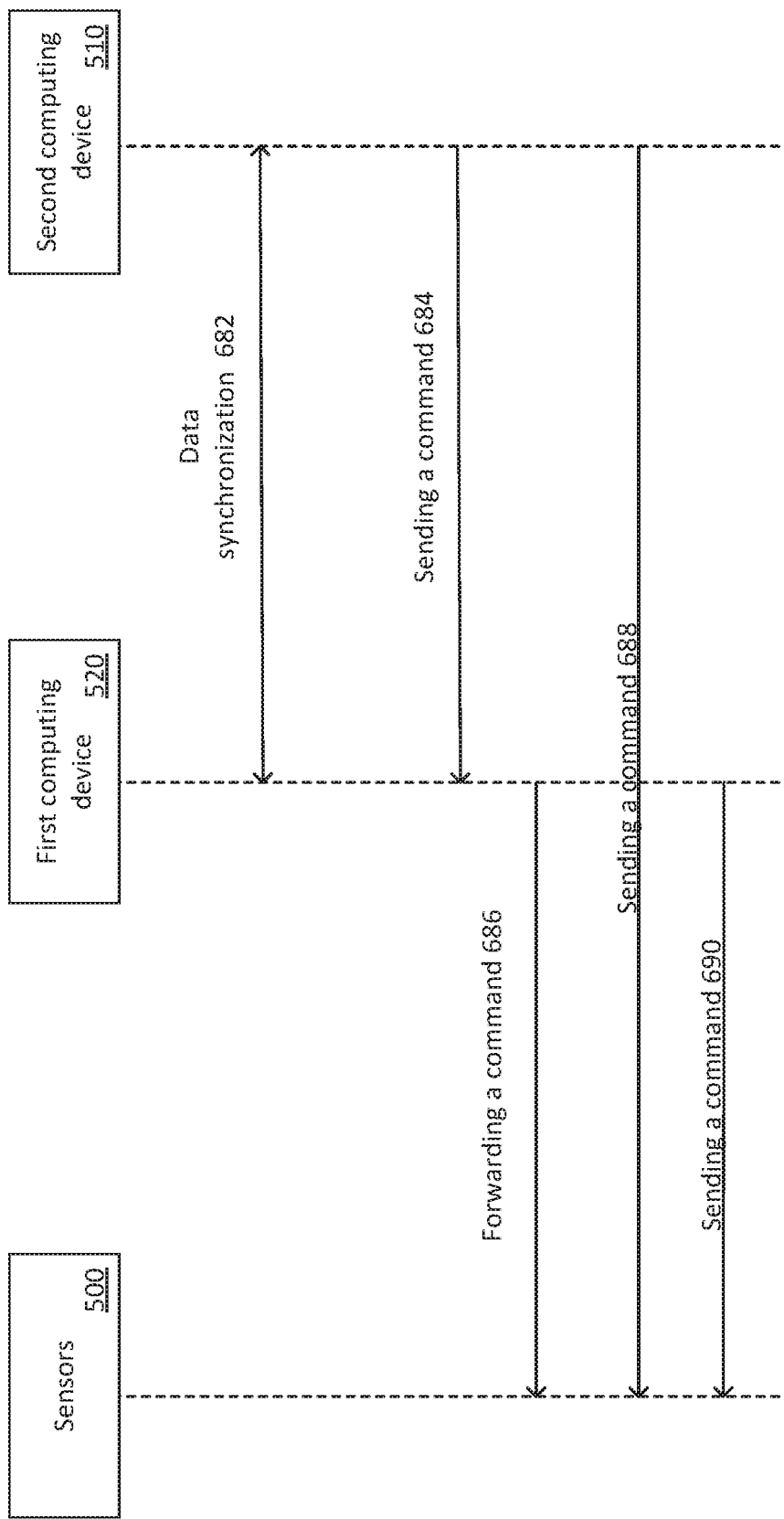
FIG. 6B illustrates an example method for controlling sensors in an automated-checkout store.

FIG. 6B illustrates an example method for controlling sensors in an automated-checkout store. In some embodiments, a second computing device 510 may be a centralized server that communicate with one or more first computing devices 520 and sensors 500. In some embodiments, the first computing device 520 and the second computing device 510 may perform data synchronization at step 682, such as time, digests, heartbeats, commands, another suitable data, or any combination thereof. In some embodiments, the second computing device 510 may send a machine learning model to the first computing device 520. The first computing device 520 may use such model to perform object identification (including object recognition, object detection). In some embodiments, the machine learning model may be trained and tested based on the existing data collected by the computing system of the store. For example, the store may use certain computing devices equipped with image sensors, weight sensors, RFID tag readers to collect features of product items for sale, and use the collected features to train and test a machine learning model for object identification. In some embodiments, after an object is detected by the sensors 500, the first computing device 520 may extract features of the object and input the extracted features to a machine-learning model to get one or more matching results with confidence values. In some embodiments, the machine learning model may be obtained from another entity and ready to be deployed.

In some embodiments, the second computing device 510 may send control commands to the first computing device 520 at step 684. The first computing device 520 may subsequently forward the commands to the sensors 500 at step 686. In some embodiments, the second computing device 510 may directly send control commands to the sensors 500 at step 688. In some embodiments, the commands may include reboot, zoom in, zoom out, adjust angle, power on, power off, update firmware, and update stored data. As an example, if a new version of firmware for the sensors 500 is released offering new security features and better performance, the second computing device 510 may download the firmware and broadcast firmware upgrade commands along with the firmware binary to the sensors 500 being upgraded. As another example, if one sensor is not monitoring the designed area (the designed area may be marked by patterns on the floor, shelves, walls, or ceiling), a control command may be delivered to the sensor to adjust the angle accordingly. In some embodiments, the first computing device 520 may use commands to control the associated sensors 500 at step 690. For example, if the first computing device 520 stops receiving sensor data or heartbeats from one sensor, it may send probing signals followed by reboot command to that sensor. In some embodiments, a command may be sent to one specific sensor (e.g., a point-to-point or unicast message to reboot a camera), a group of sensors (e.g. a unicast or multicast message to adjust angle), or all sensors (e.g., a broadcasting message to update firmware).

Figure 7:
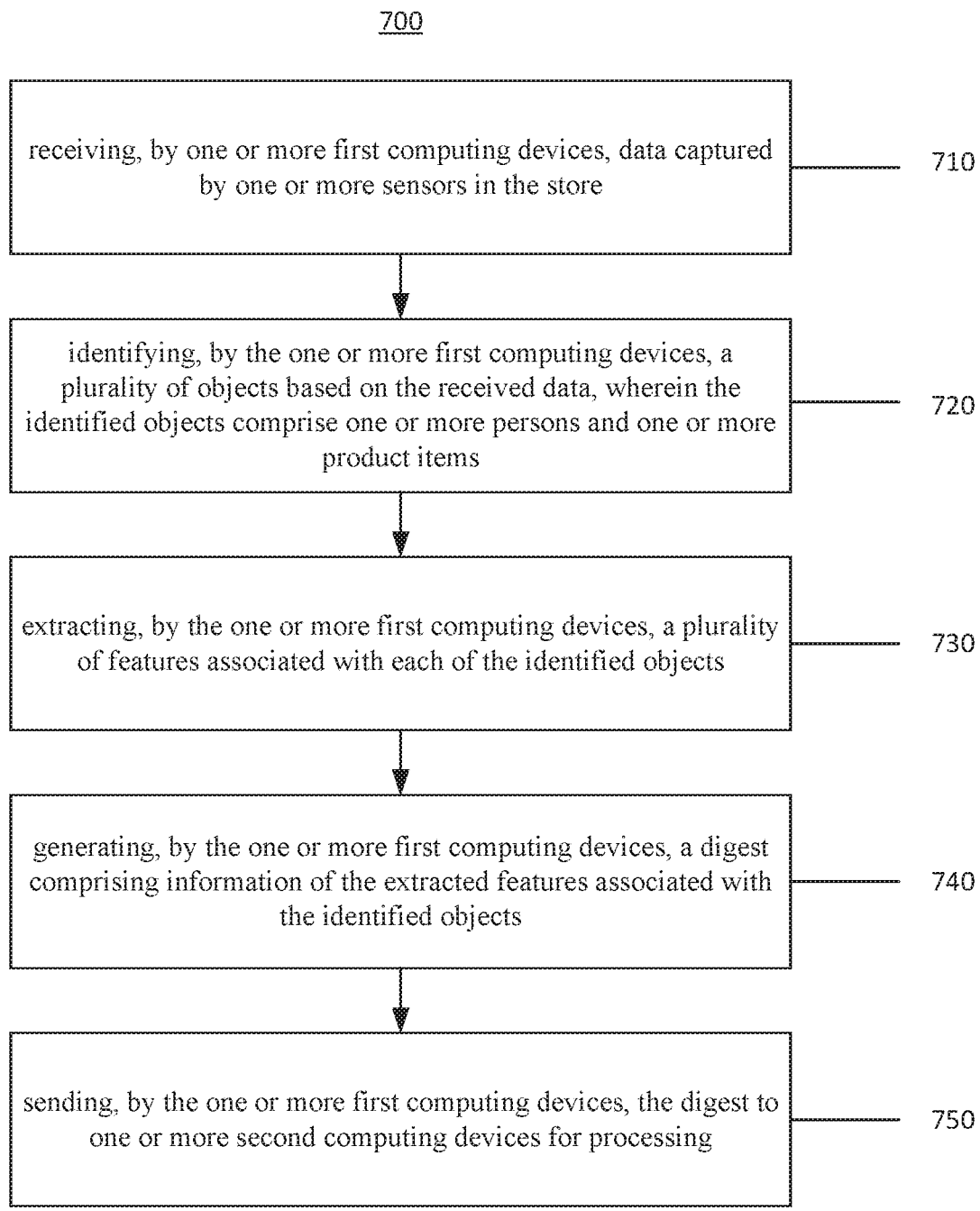
FIG. 7 illustrates a method of tracking objects in an automated-checkout store.

FIG. 7 illustrates a method of tracking objects in an automated-checkout store. The method 700 may be implemented in an environment shown in FIGS. 1 and 2. The method 700 may be performed by a device, apparatus, or system shown in FIG. 3. The method 700 may be performed by a sensor-computer system shown in FIGS. 5A-5D. Depending on the implementation, the method 700 may include additional, fewer, or alternative steps performed in various orders or in parallel.

Block 710 includes receiving, by one or more first computing devices, data captured by one or more sensors in the store. In some embodiments, the one or more first computing devices may be organized based on a hierarchical structure; the one or more first computing devices may comprise a group of computing devices respectively associated with a plurality of regions in the store and a different computing device associated with a region in the store that comprises the plurality of regions, wherein the different computing device is superior to the group of computing devices in the hierarchical structure; and the generating a digest may comprise: generating, by the group of computing devices, a plurality of intermediate results based on the data captured by the one or more sensors; sending, by the group of computing devices, the intermediate results to the different computing device; and generating, by the different computing device, the digest based on the intermediate results.

Block 720 includes identifying, by the one or more first computing devices, a plurality of objects based on the received data, wherein the identified objects comprise one or more persons and one or more product items. In some embodiments, the identifying a plurality of objects comprises: identifying, by the one or more first computing devices, a person based on the received data; and identifying, by the one or more first computing devices based on the received data, one or more product items that are located in proximity to a hand of the person.

Block 730 includes extracting, by the one or more first computing devices, a plurality of features associated with each of the identified objects. In some embodiments, the features associated with each of the identified objects may comprise: a location, a weight, a shape, a color, a surface force image, a position, or a conductivity.

Block 740 includes generating, by the one or more first computing devices, a digest comprising information of the extracted features associated with the identified objects. In some embodiments, the generating a digest comprising information of the extracted features associated with the identified objects may comprise: determining, by the one or more first computing devices, an interaction between one of the one or more persons and one of the one or more product items based on the extracted features; and generating, by the one or more first computing devices, the digest based on the determined interaction.

Block 750 includes sending, by the one or more first computing devices, the digest to one or more second computing devices for processing.

In some embodiments, the method 700 may further comprise: determining, by the one or more second computing devices, one or more interactions between one of the one or more persons and one of the one or more product items based on the digest; and generating, by one or more the second computing devices, a bill for the person based on the determined one or more interactions. In some embodiments, the generating a bill may comprise: retrieving, by the one or more second computing devices, price information of the one of the one or more product items; and generating, by the one or more second computing devices, the bill based on the retrieved price information.

In some embodiments, the method 700 may further comprise: receiving, by the one or more first computing devices from the one or more second computing devices, data associated with a machine-learning model, wherein the machine-learning model is configured to identify one or more objects based on one or more features associated with each of the one or more objects.

In some embodiments, the method 700 may further comprise: receiving, by the one or more first computing devices from the one or more second computing devices, information associated with a plurality of features and an identifier; determining that the received identifier corresponds to one of the identified objects based on comparing the received features with the extracted features associated with the identified object; and wherein the generating a digest comprises including a mapping relationship between the received identifier and one or more of the features associated with the identified object in the digest.

In some embodiments, the method 700 may further comprise: receiving, by one of the one or more first computing devices from a third computing device, information associated with a plurality of features of one of the identified objects; and wherein the generating a digest comprises including the received information in the digest.

In some embodiments, the method 700 may further comprise: receiving, by the one or more first computing devices from the one or more second computing devices, one or more control commands for the one or more sensors; and forwarding, by the one or more first computing devices, the one or more control commands to the one or more sensors. In some embodiments, the one or more control commands may comprise reboot, zoom in, zoom out, adjust angle, power on, power off, update firmware, or update stored data.

Figure 8:
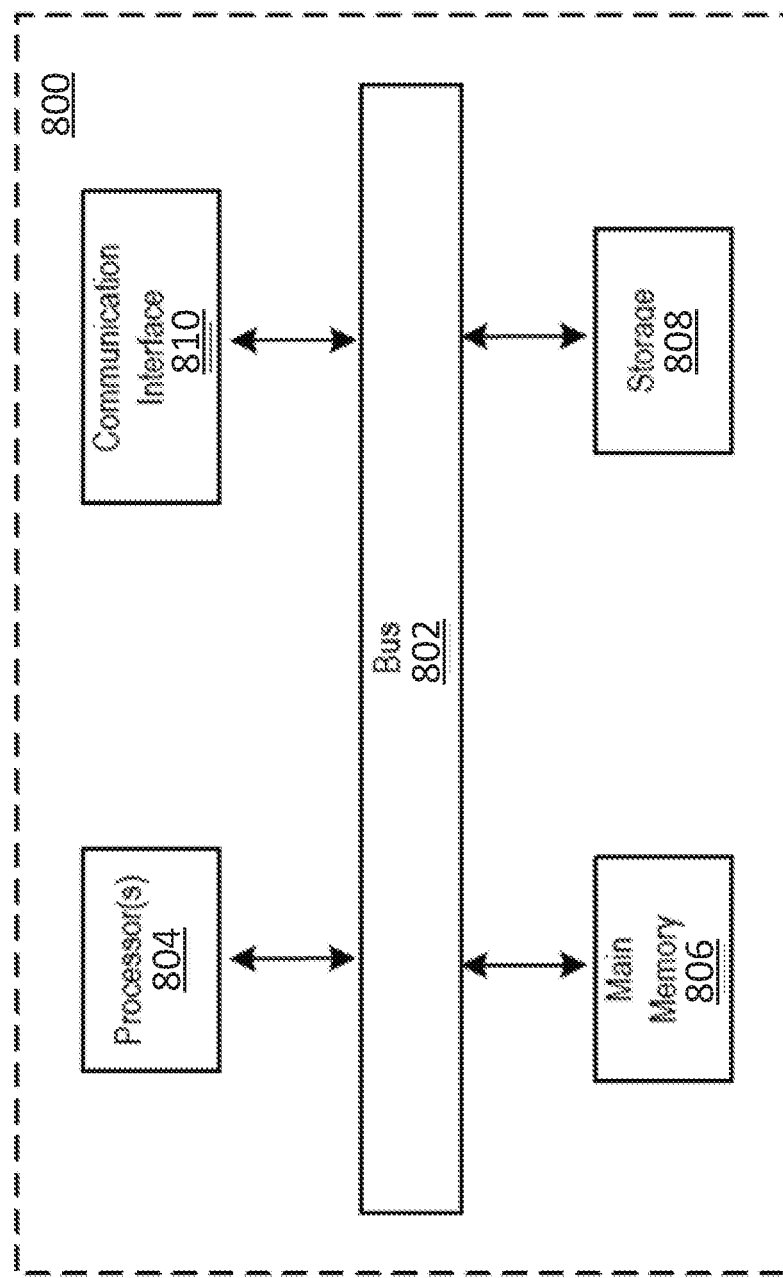
FIG. 8 illustrates an example electronic device for tracking persons in an automated-checkout store.

FIG. 8 illustrates an example electronic device for tracking persons in an automated-checkout store. The electronic device may be used to implement one or more components of the systems shown in FIGS. 3A, 3B, 4, and 5A-5D. The electronic device 800 may comprise a bus 802 or other communication mechanism for communicating information and one or more hardware processors 804 coupled with bus 802 for processing information. Hardware processor(s) 804 may be, for example, one or more general purpose microprocessors.

The electronic device 800 may also include a main memory 806, such as a random-access memory (RAM), cache and/or other dynamic storage devices, coupled to bus 802 for storing information and instructions to be executed by processor(s) 804. Main memory 806 also may be used for storing temporary variables or other intermediate information during execution of instructions to be executed by processor(s) 804. Such instructions, when stored in storage media accessible to processor(s) 804, may render electronic device 800 into a special-purpose machine that is customized to perform the operations specified in the instructions. Main memory 806 may include non-volatile media and/or volatile media. Non-volatile media may include, for example, optical or magnetic disks. Volatile media may include dynamic memory. Common forms of media may include, for example, a floppy disk, a flexible disk, hard disk, solid state drive, magnetic tape, or any other magnetic data storage medium, a CD-ROM, any other optical data storage medium, any physical medium with patterns of holes, a RAM, a DRAM, a PROM, and EPROM, a FLASH-EPROM, NVRAM, any other memory chip or cartridge, or networked versions of the same.

The electronic device 800 may implement the techniques described herein using customized hard-wired logic, one or more ASICs or FPGAs, firmware and/or program logic which in combination with the electronic device may cause or program electronic device 800 to be a special-purpose machine. According to one embodiment, the techniques herein are performed by electronic device 800 in response to processor(s) 804 executing one or more sequences of one or more instructions contained in main memory 806. Such instructions may be read into main memory 806 from another storage medium, such as storage device 808. Execution of the sequences of instructions contained in main memory 806 may cause processor(s) 804 to perform the process steps described herein. For example, the processes/methods disclosed herein may be implemented by computer program instructions stored in main memory 806. When these instructions are executed by processor(s) 804, they may perform the steps as shown in corresponding figures and described above. In alternative embodiments, hard-wired circuitry may be used in place of or in combination with software instructions.

The electronic device 800 also includes a communication interface 810 coupled to bus 802. Communication interface 810 may provide a two-way data communication coupling to one or more network links that are connected to one or more networks. As another example, communication interface 810 may be a local area network (LAN) card to provide a data communication connection to a compatible LAN (or WAN component to communicated with a WAN). Wireless links may also be implemented.

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

When the functions disclosed herein are implemented in the form of software functional units and sold or used as independent products, they can be stored in a processor executable non-volatile computer readable storage medium. Particular technical solutions disclosed herein (in whole or in part) or aspects that contributes to current technologies may be embodied in the form of a software product. The software product may be stored in a storage medium, comprising a number of instructions to cause a computing device (which may be a personal computer, a server, a network device, and the like) to execute all or some steps of the methods of the embodiments of the present application. The storage medium may comprise a flash drive, a portable hard drive, ROM, RAM, a magnetic disk, an optical disc, another medium operable to store program code, or any combination thereof.

Particular embodiments further provide a system comprising a processor and a non-transitory computer-readable storage medium storing instructions executable by the processor to cause the system to perform operations corresponding to steps in any method of the embodiments disclosed above. Particular embodiments further provide a non-transitory computer-readable storage medium configured with instructions executable by one or more processors to cause the one or more processors to perform operations corresponding to steps in any method of the embodiments disclosed above.

Embodiments disclosed herein may be implemented through a cloud platform, a server or a server group (hereinafter collectively the "service system") that interacts with a client. The client may be a terminal device or a client registered by a user at a platform, wherein the terminal device may be a mobile terminal, a personal computer (PC), and any device that may be installed with a platform application program.

The various features and processes described above may be used independently of one another or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The exemplary systems and components described herein may be configured differently than described. For example, elements may be added to, removed from, or rearranged compared to the disclosed example embodiments.

The various operations of exemplary methods described herein may be performed, at least partially, by an algorithm. The algorithm may be comprised in program codes or instructions stored in a memory (e.g., a non-transitory computer-readable storage medium described above). Such algorithm may comprise a machine learning algorithm. In some embodiments, a machine learning algorithm may not explicitly program computers to perform a function but can learn from training data to make a prediction model that performs the function.

The various operations of exemplary methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

As used herein, "or" is inclusive and not exclusive, unless expressly indicated otherwise or indicated otherwise by context. Therefore, herein, "A, B, or C" means "A, B, A and B, A and C, B and C, or A, B, and C," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The term "include" or "comprise" is used to indicate the existence of the subsequently declared features, but it does not exclude the addition of other features. Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

What is claimed is:

1. A computer-implemented method for tracking objects in a store, comprising:
   receiving, by one or more first computing devices, data captured by one or more sensors in the store;
   identifying, by the one or more first computing devices, a plurality of objects based on the received data, wherein the identified objects comprise one or more persons and one or more product items;
   extracting, by the one or more first computing devices, a plurality of features associated with each of the identified objects;
   generating, by the one or more first computing devices, a digest comprising information of the extracted features associated with the identified objects;
   sending, by the one or more first computing devices, the digest to one or more second computing devices for processing;
   receiving, by the one or more first computing devices from the one or more second computing devices, one or more control commands for the one or more sensors; and
   forwarding, by the one or more first computing devices, the one or more control commands to the one or more sensors.

2. The method of claim 1, further comprising:
   determining, by the one or more second computing devices, one or more interactions between one of the one or more persons and one of the one or more product items based on the digest; and
   generating, by one or more the second computing devices, a bill for the person based on the determined one or more interactions.

3. The method of claim 2, wherein the generating a bill comprises:
   retrieving, by the one or more second computing devices, price information of the one of the one or more product items; and
   generating, by the one or more second computing devices, the bill based on the retrieved price information.

4. The method of claim 1, further comprising:
   receiving, by the one or more first computing devices from the one or more second computing devices, data associated with a machine-learning model, wherein the machine-learning model is configured to identify one or more objects based on one or more features associated with each of the one or more objects.

5. The method of claim 1, wherein the identifying a plurality of objects comprises:
   identifying, by the one or more first computing devices, a person based on the received data; and
   identifying, by the one or more first computing devices based on the received data, one or more product items that are located in proximity to a hand of the person.

6. The method of claim 1, wherein the features associated with each of the identified objects comprise:
   a location;
   a weight;
   a shape;
   a color;
   a surface force image;
   a position; or
   a conductivity.

7. The method of claim 1, wherein the generating a digest comprising information of the extracted features associated with the identified objects comprises:
   determining, by the one or more first computing devices, an interaction between one of the one or more persons and one of the one or more product items based on the extracted features; and
   generating, by the one or more first computing devices, the digest based on the determined interaction.

8. The method of claim 1, further comprising:
   receiving, by the one or more first computing devices from the one or more second computing devices, information associated with a plurality of features and an identifier;
   determining that the received identifier corresponds to one of the identified objects based on comparing the received features with the extracted features associated with the identified object; and
   wherein the generating a digest comprises including a mapping relationship between the received identifier and one or more of the features associated with the identified object in the digest.

9. The method of claim 1, further comprising:
receiving, by the one or more first computing devices from a third computing device, information associated with a plurality of features of one of the identified objects; and
wherein the generating a digest comprises including the received information in the digest.

10. The method of claim 1, wherein the one or more control commands comprise:
reboot;
zoom in;
zoom out;
adjust angle;
power on;
power off;
update firmware; or
update stored data.

11. The method of claim 1, wherein:
the one or more first computing devices are organized based on a hierarchical structure;
the one or more first computing devices comprise a group of computing devices respectively associated with a plurality of regions in the store and a different computing device associated with a region in the store that comprises the plurality of regions, wherein the different computing device is superior to the group of computing devices in the hierarchical structure; and
the generating a digest comprises:
generating, by the group of computing devices, a plurality of intermediate results based on the data captured by the one or more sensors;
sending, by the group of computing devices, the intermediate results to the different computing device; and
generating, by the different computing device, the digest based on the intermediate results.

12. A system for tracking objects in a store comprising a plurality of sensors and a computer system that comprises one or more first computing devices and one or more second computing devices, the computer system comprising a processor and a non-transitory computer-readable storage medium storing instructions executable by the processor to cause the system to perform operations comprising:
receiving, by the one or more first computing devices, data captured by one or more sensors in the store;
identifying, by the one or more first computing devices, a plurality of objects based on the received data, wherein the identified objects comprise one or more persons and one or more product items;
extracting, by the one or more first computing devices, a plurality of features associated with each of the identified objects;
generating, by the one or more first computing devices, a digest comprising information of the extracted features associated with the identified objects;
sending, by the one or more first computing devices, the digest to the one or more second computing devices for processing;
receiving, by the one or more first computing devices from the one or more second computing devices, one or more control commands for the one or more sensors; and
forwarding, by the one or more first computing devices, the one or more control commands to the one or more sensors.

13. The system of claim 12, wherein the operations further comprise:
determining, by the one or more second computing devices, one or more interactions between one of the one or more persons and one of the one or more product items based on the digest; and
generating, by one or more the second computing devices, a bill for the person based on the determined one or more interactions.

14. The system of claim 12, wherein the operations further comprise:
receiving, by the one or more first computing devices from the one or more second computing devices, data associated with a machine-learning model, wherein the machine-learning model is configured to identify one or more objects based on one or more features associated with each of the one or more objects.

15. The system of claim 12, wherein:
the one or more first computing devices are organized based on a hierarchical structure;
the one or more first computing devices comprise a group of computing devices respectively associated with a plurality of regions in the store and a different computing device associated with a region in the store that comprises the plurality of regions, wherein the different computing device is superior to the group of computing devices in the hierarchical structure; and
the generating a digest comprises:
generating, by the group of computing devices, a plurality of intermediate results based on the data captured by the one or more sensors;
sending, by the group of computing devices, the intermediate results to the different computing device; and
generating, by the different computing device, the digest based on the intermediate results.

16. A non-transitory computer-readable storage medium for tracking objects in a store, configured with instructions executable by one or more processors to cause the one or more processors to perform operations comprising:
receiving data captured by one or more sensors in the store;
identifying a plurality of objects based on the received data, wherein the identified objects comprise one or more persons and one or more product items;
extracting a plurality of features associated with each of the identified objects;
generating a digest comprising information of the extracted features associated with the identified objects; and
sending the digest to a computing device for processing;
receiving, from the computing devices, one or more control commands for the one or more sensors; and
forwarding the one or more control commands to the one or more sensors.

17. The non-transitory computer-readable storage medium of claim 16, wherein the identifying a plurality of objects comprises:
identifying a person based on the received data; and
identifying, based on the received data, one or more product items that are located in proximity to a hand of the person.

18. The non-transitory computer-readable storage medium of claim 16, wherein the operations further comprise:
receiving, from the computing device, data associated with a machine-learning model, wherein the machine-learning model is configured to identify one or more objects based on one or more features associated with each of the one or more objects.

* * * * *